US012702957B2

(12) United States Patent
Zhu et al.

(10) Patent No.: US 12,702,957 B2
(45) Date of Patent: Aug. 11, 2026

(54) ORGANOSILICA MEMBRANES, METHODS OF MAKING SAME, AND USES THEREOF

(71) Applicant: The Research Foundation for The State University of New York, Amherst, NY (US)

(72) Inventors: Lingxiang Zhu, Amherst, NY (US); Liang Huang, Amherst, NY (US); Mark Swihart, Williamsville, NY (US); Haiqing Lin, Buffalo, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 553 days.

(21) Appl. No.: 17/759,038

(22) PCT Filed: Jan. 19, 2021

(86) PCT No.: PCT/US2021/014018

§ 371 (c)(1),
(2) Date: Jul. 18, 2022

(87) PCT Pub. No.: WO2021/146733

PCT Pub. Date: Jul. 22, 2021

(65) Prior Publication Data

US 2023/0058997 A1 Feb. 23, 2023

Related U.S. Application Data

(60) Provisional application No. 62/962,809, filed on Jan. 17, 2020.

(51) Int. Cl.

| | |
|---|---|
| ***B01D 69/12*** | (2006.01) |
| ***B01D 53/22*** | (2006.01) |
| ***B01D 61/02*** | (2006.01) |
| ***B01D 67/00*** | (2006.01) |

(Continued)

(52) U.S. Cl.
CPC ......... *B01D 69/125* (2013.01); *B01D 53/228* (2013.01); *B01D 61/027* (2013.01);
(Continued)

(58) Field of Classification Search
None
See application file for complete search history.

(56) References Cited

U.S. PATENT DOCUMENTS

| | | | |
|---|---|---|---|
| 4,230,463 | A | 10/1980 | Henis et al. |
| 4,602,922 | A | 7/1986 | Cabasso et al. |

(Continued)

FOREIGN PATENT DOCUMENTS

| | | | |
|---|---|---|---|
| JP | 2016-159217 | A | 9/2016 |

OTHER PUBLICATIONS

Anonymous, Novel, Spiral, High Temperature Gas to Gas Heat Exchanger, IP.com Prior Art Databse, Dec. 16, 2003, 4 pages.

(Continued)

*Primary Examiner* — Bobby Ramdhanie
(74) *Attorney, Agent, or Firm* — Hodgson Russ LLP

(57) ABSTRACT

Provided are composite articles having a membrane and a porous substrate, where the porous substrate has the membrane disposed thereon. The membrane has two layers, where the first layer has the second layer disposed thereon, and each layer has a plurality of polymer chains with a plurality of silicon-oxygen groups and a plurality of silicon-carbon groups. The first layer has a silicon to oxygen ratio of about 4:1 to about 1:1.25 and a silicon to carbon ratio of about 1:2 to about 1:10, and the second layer has a silicon to oxygen ratio of about 1:1 to about 1:2 and a silicon to carbon ratio of about 2:1 to about 10:1. At least a portion of the polymer chains of the second layer am crosslinked. The composite articles may be used in gas separation methods.

(Continued)

Also provided are methods of making the composite articles and devices utilizing the composite articles.

20 Claims, 20 Drawing Sheets

(51) Int. Cl.
*B01D 69/02* (2006.01)
*B01D 69/10* (2006.01)
*B01D 71/70* (2006.01)

(52) U.S. Cl.
CPC ........... *B01D 67/009* (2013.01); *B01D 69/02* (2013.01); *B01D 69/10* (2013.01); *B01D 69/12* (2013.01); *B01D 69/1214* (2022.08); *B01D 71/701* (2022.08); *B01D 2256/16* (2013.01); *B01D 2256/18* (2013.01); *B01D 2257/504* (2013.01); *B01D 2257/702* (2013.01); *B01D 2323/12* (2013.01); *B01D 2323/30* (2013.01); *B01D 2323/385* (2013.01); *B01D 2325/04* (2013.01); *B01D 2325/20* (2013.01)

(56) References Cited

U.S. PATENT DOCUMENTS 5,049,167 A * 9/1991 Castro ................ B01D 69/1251 95/55
7,510,595 B2 * 3/2009 Freeman ........... B01D 69/14111 96/13
7,964,020 B2 * 6/2011 Baker .................... B01D 53/22 96/9
8,016,923 B2 * 9/2011 Baker .................... B01D 53/22 96/9
8,128,733 B2 * 3/2012 Wijmans ................ B01D 53/22 95/45
8,623,926 B2 * 1/2014 Wynn ................. C07C 29/1518 518/700
8,771,637 B2 * 7/2014 Wynn ....................... C01B 3/56 423/437.1
9,017,451 B2 * 4/2015 Wynn .................. B01D 53/226 95/45
2015/0135957 A1 5/2015 Sharma
2017/0216765 A1 * 8/2017 Qiao ................... B01D 53/228

OTHER PUBLICATIONS

Lin, W.C., et al., Temporary Wettability Tuning of PCL/PDMS Micro Pattern Using the Plasma Treatments, Materials, Feb. 20, 2019, vol. 12, No. 644, pp. 1-16.
Weigelt, F., et al., Novel Polymeric Thin-Film Composite Membranes for High-Temperature Gas Separations, Membranes, Apr. 10, 2019, vol. 9, No. 51, pp. 1-13.

* cited by examiner (b) and (d) This work

1: POSi120@150°C 2-5: POSi120@200°C

| (b) Polymeric materials | Ref. |
|---|---|
| 6-7: PBI-$H_3PO_4$@200°C | 8 |
| 8: PBI@200°C | 38 |
| 9: PBI CMS_800@100°C | 21 |
| 10: PBI CMS_900@150°C | 21 |
| 11: PBI Pd@200°C | 20 |
| 12: PI/ZIF-71@150°C | 18 |
| 13: PBI/ZIF-90@150°C | 39 |
| 14: PBI/ZIF-7@180°C | 19 |
| 15: PBI/ZIF-8@230°C | 36 |

| (d) Inorganic membranes | Ref. |
|---|---|
| 16: Si600@200°C | 10 |
| 17: SiPBI@200°C | 12 |
| 18: Zeolites@200°C | 13 |
| 19: RUB-15@200°C | 1 |
| 20: $Zn_2(Bim)_4$@200°C | 14 |
| 21: $Zn_2(Bim)_3$@120°C | 41 |
| 22: GO@135°C | 2 |
| 23: GO@@100°C | 3 |
| 24: ZIF/GO@250°C | 42 |
| 25: $MoS_2$@160°C | 16 |
| 26: g-$C_3N_4$@150°C | 17 |

ORGANOSILICA MEMBRANES, METHODS OF MAKING SAME, AND USES THEREOF

CROSS REFERENCE TO RELATED APPLICATION

This application claims priority to U.S. Provisional Application No. 62/962,809, filed Jan. 17, 2020, the entire disclosure of which is incorporated herein by reference.

STATEMENT REGARDING FEDERALLY SPONSORED RESEARCH

This invention was made with government support under grant no. 1554236 awarded by the National Science Foundation and DE-FE0026463 awarded by the Department of Energy. The government has certain rights in the invention.

BACKGROUND OF THE DISCLOSURE

Blue hydrogen ($H_2$) as a zero-emission energy carrier has the potential to achieve a large-scale reduction of $CO_2$ emissions and foster a transition to a carbon-neutral economy. $H_2$ is predominantly produced by steam reforming of natural gas or gasification of coal, processes from which byproduct $CO_2$ must be captured for utilization or storage to mitigate its emissions to the environment. The state-of-the-art $CO_2$ capture technology (e.g., the Selexol process) is expensive and may increase the cost of Hz production by 30%. Gas separation membranes with $H_2/CO_2$ selectivity of 30 or above at syngas processing temperatures (150° C. or above) provide a low-cost and energy-efficient alternative for the sustainable production of blue $H_2$.[6] Industrial gas separation membranes are usually made of polymers with excellent processability and scalability. However, polymers are subject to an inherent permeability/selectivity trade-off, i.e., polymers with higher $H_2$ permeability tend to have higher free volume and thus lower $H_2/CO_2$ selectivity. Most polymeric membranes also lose size-sieving ability at high temperatures and show low selectivity.

Porous materials with well-controlled ultramicropores with molecular sieving ability have been extensively explored for $H_2/CO_2$ separation, including silica,[10-12] zeolites,[1, 13] metal-organic frameworks (MOFs),[14] porous organic frameworks,[14, 15] and 2D materials with subnanometer channels such as graphene oxide (GO),[2, 3] $MoS_2$,[16] and graphitic carbon nitride (g-$C_3N_4$).[17] However, the production of defect-free nanoporous membranes on a large scale presents an enormous challenge. To this end, mixed matrix materials (MMMs) containing inorganic nanofillers in polymers have been pursued to achieve both superior separation properties and processability.[18, 19] Polymers can also be pyrolyzed at 500-900° C. to prepare carbon molecular sieves (CMS)[20] or silica membranes[21, 22] to achieve superior $H_2/CO_2$ separation properties. Nanoporous silica membranes exhibit excellent $H_2/CO_2$ separation properties for sustainable $H_2$ production and $CO_2$ capture but are prepared via complicated thermal processes above 400° C., which prevent their scalable production at low cost. Thus, there continues to be a need for efficient and commercially scalable methods of gas separation.

BRIEF SUMMARY OF THE DISCLOSURE

The present disclosure provides composite articles, membranes, methods of making the membranes and/or composite articles, devices comprising the membranes and/or composite articles, and methods of using the membranes and/or composite articles.

In an aspect, the present disclosure provides a membrane disposed on a porous substrate, which may be referred to as a composite article. The membrane may comprise a plurality of polymer chains comprising a plurality of silicon-oxygen groups and a plurality of silicon-carbon groups. A portion of the polymer chains may be crosslinked.

A composite article of the present disclosure comprises, consists essentially of, or consists of a porous substrate and a membrane.

A membrane of the present disclosure may have a plurality of domains. For example, a membrane has two domains. A second domain has a smaller carbon to silicon ratio relative to the first domain. The second domain may be referred to as an organosilica membrane. Thus, the carbon to silicon ratio decreases from a surface of the first domain opposite the second domain to a surface of the first domain opposite the surface of second first domain. The domains may be referred to as non-discrete layers or simply layers. In various examples, a first domain or layer is polydimethylsiloxane (PDMS), is substantially PDMS, or comprises PDMS.

In an aspect, the present disclosure provides a method of forming a composite article of the present disclosure. The method comprises disposing a domain a precursor (of the present disclosure) on a porous substrate, where the domain precursor has silicon to oxygen ratio of about 4:1 to about 1:1.25 (e.g., 4:1 to 1:1.25), including every 0.01 ratio value and range therebetween, and a silicon to carbon ratio of about 1:2 to about 1:10 (e.g., 1:2 to 1:10), including every 0.01 ratio value and range therebetween; plasma (e.g., oxygen plasma) treating the domain precursor, wherein the plasma treating results in the formation of an oxidized second domain (second layer) and a non-oxidized or substantially non-oxidized first domain (first layer).

In various examples, the first layer and second layer are formed from a domain precursor via oxidation with plasma (e.g., oxygen plasma). The domain precursor comprises one or more silicon-containing polymers further comprising oxygen and carbon. For example, a portion of a surface of the domain precursor is reacted (e.g., etched) with plasma (e.g., oxygen plasma), a second layer is formed having a smaller carbon/silicon ratio relative to the domain precursor and a larger oxygen/silicon ratio relative to the domain precursor, where at least a portion of the unreacted domain precursor is the first layer. Without intending to be bound by any particular theory, a portion of the first layer may be partially oxidized, but less oxidized than the second layer.

In an aspect, the present disclosure provides devices comprising a composite article of the present disclosure or membrane (e.g., an organosilica membrane of the present disclosure). The device may be a gas separation device or a liquid separation device.

In various examples, the gas separation device is configured to separate helium gas and/or hydrogen gas from one or more hydrocarbon gas(es). In various examples, the liquid separation device is configured as a nanoseparation device to treat liquid mixtures.

In an aspect, the present disclosure provides a gas separation method.

The gas separation method may comprise: contacting a gas sample comprising hydrogen and/or helium and carbon monoxide and/or one or more hydrocarbon(s) with a composite article of the present disclosure, a membrane of the present disclosure (e.g., an organosilica membrane) of the present disclosure, a composite article of the present disclosure made by a method of the present disclosure and/or a device of the present disclosure, where at least a portion or all of the hydrogen and/or helium is separated from at least a portion or all of the carbon monoxide and/or the one or more hydrocarbon(s). The method may be performed at a temperature of −20° C. to 100° C., including every 0.01° C. value and range therebetween.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
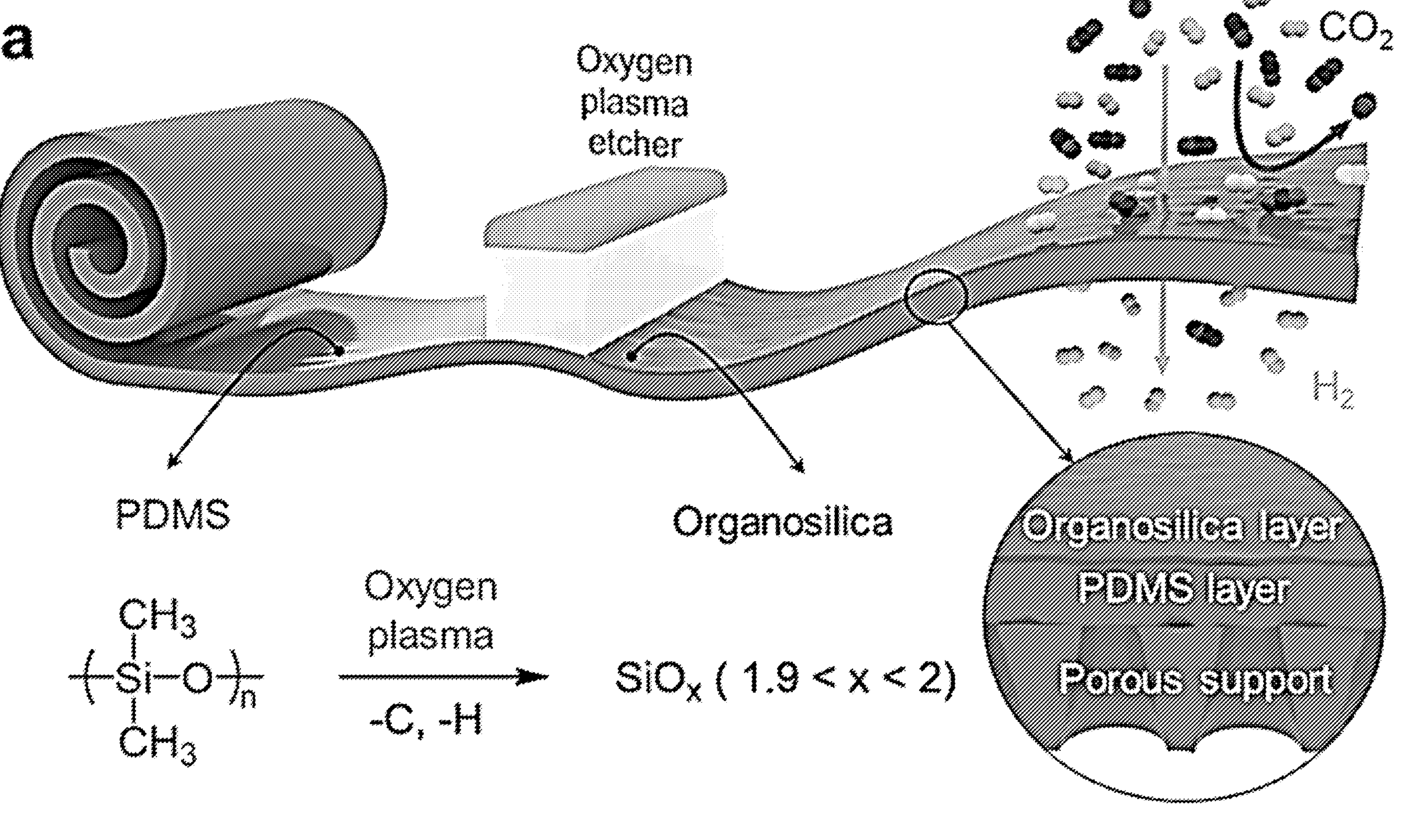
FIG. 1 shows a) schematic illustration of a room-temperature approach to silica membranes by integrating oxygen plasma treatment into a conventional polymer membrane fabrication route. Oxygen plasma can convert the surface of the PDMS into a silica-like structure, or organosilica. b) A schematic of the POSi membrane fabrication procedure, including PDMS coating and plasma treatment. c) Cross-sectional micrograph of a POSi120 membrane. d) AFM topographic image showing the surface roughness of a POSi120 membrane.
Figure 1:
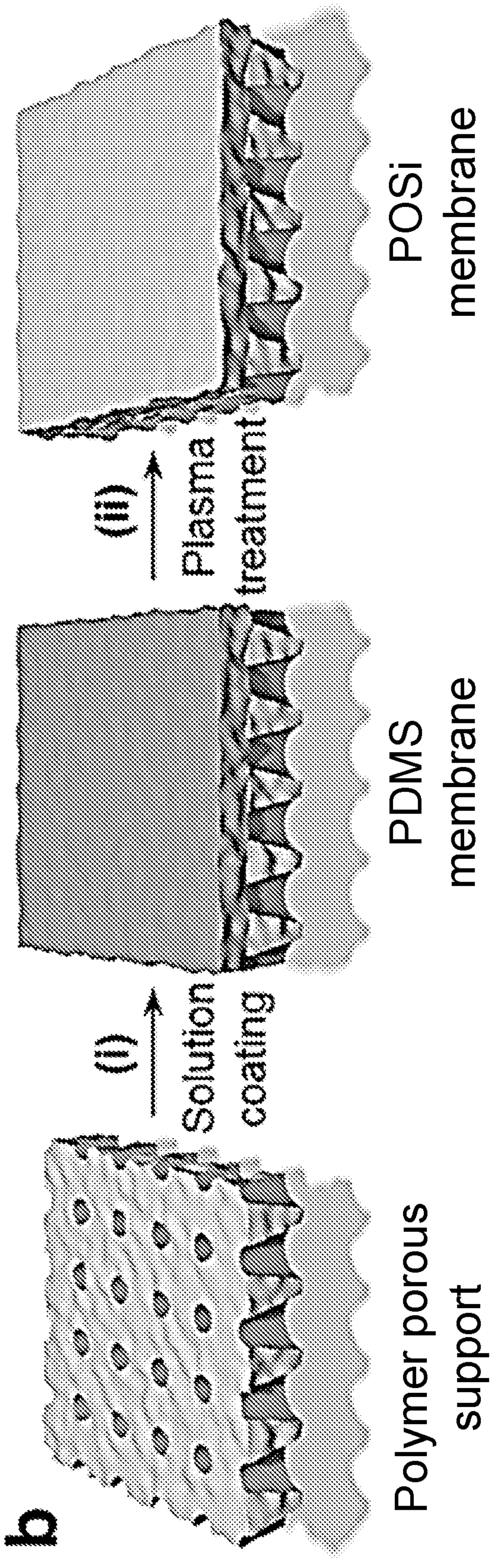
Figure 1:
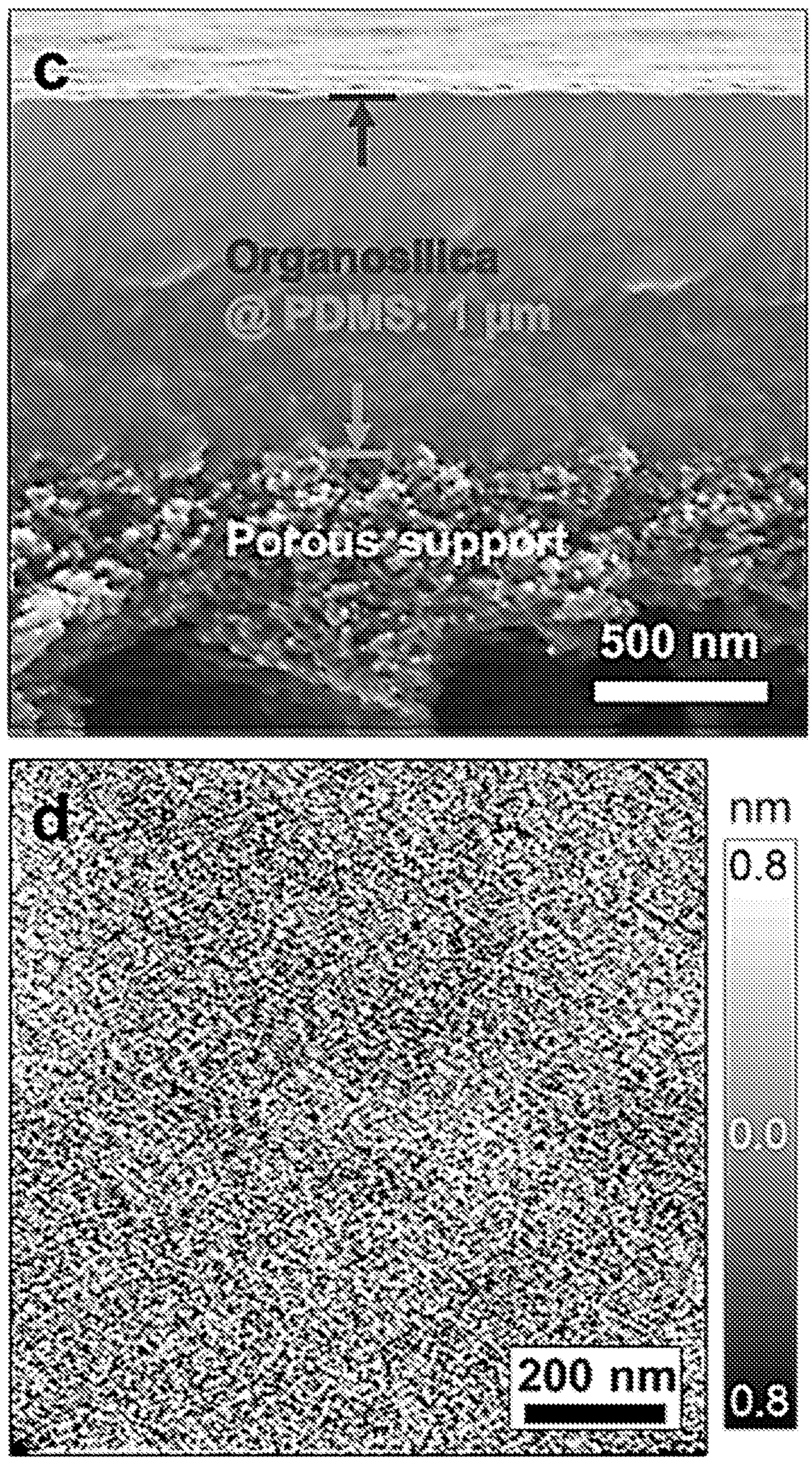

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent, trivalent, and the like, radicals). Illustrative examples of groups include:

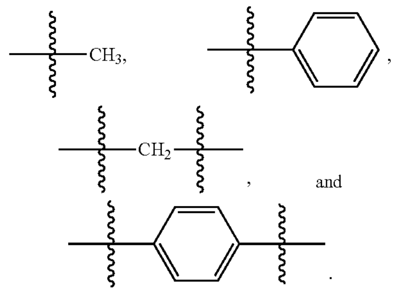

As used herein, unless otherwise stated, the term "about" may be interpreted to mean±5% of the value the term "about" is used with.

Throughout this application, the use of the singular form encompasses the plural form and vice versa. For example, "a", or "an" also includes a plurality of the referenced items, unless otherwise indicated.

The present disclosure provides composite articles, membranes, methods of making the membranes and/or composite articles, devices comprising the membranes and/or composite articles, and methods of using the membranes and/or composite articles.

In an aspect, the present disclosure provides a membrane disposed on a porous substrate, which may be referred to as a composite article. The membrane may comprise a plurality of polymer chains comprising a plurality of silicon-oxygen groups and a plurality of silicon-carbon groups. A portion of the polymer chains may be crosslinked.

Various polymer chains comprising a plurality of silicon-oxygen groups and a plurality of silicon-carbon groups may be used. Non-limiting examples are Si-containing polymers (such as, for example, polydimethylsiloxane (PDMS) and the like), Si-containing polymer blends, polymers doped by Si-containing chemicals, and the like, and combinations thereof. Examples of Si-containing polymers include, but are not limited to, polysiloxanes, polysilanes, polysilazanes, polycarbosilanes, and polysilphenylenes. Non-limiting examples of polysiloxanes include polydimethylsiloxane, polydiethylsiloxane, polyethylmethylsiloxane, polyoctylmethylsiloxane, polytetradecylmethylsiloxane, poly(methylhydrosiloxane), poly(methylphenylsiloxane), poly(dimethylsiloxane-co-alkylmethylsiloxane), poly(dimethylsiloxane-co-diphenylsiloxane), and the like, and combinations thereof. Additional examples of Si-containing polymers (e.g., polysiloxanes) are polysiloxanes commercially obtained from Gelest, Inc.

A composite article of the present disclosure comprises, consists essentially of, or consists of a porous substrate and a membrane.

A membrane of the present disclosure may have a plurality of domains (also referred to herein as layers). For example, a membrane has two domains. A second domain has a smaller carbon to silicon ratio relative to the first domain. The second domain may be referred to as an organosilica membrane. Thus, the carbon to silicon ratio decreases from a surface of the first domain opposite the second domain to a surface of the first domain opposite the surface of second first domain. The domains may be referred to as non-discrete layers or simply layers. In various examples, a first domain or layer is polydimethylsiloxane (PDMS), is substantially PDMS, or comprises PDMS.

A first layer and second layer may be formed from a domain precursor via oxidation with plasma (e.g., oxygen plasma). The domain precursor comprises, consists essentially of, or consists of one or more silicon-containing polymers further comprising oxygen and carbon. The domain precursor has a silicon to oxygen ratio of about 4:1 to 1:1.25, including every 0.01 ratio value and range therebetween, and a silicon to carbon ratio of about 1:2 to about 1:10, including every 0.01 ratio value and range therebetween. In various examples, the domain precursor is PDMS. For example, a portion of a surface of the domain precursor is reacted (e.g., etched) with plasma (e.g., oxygen plasma), a second domain (layer) is formed having a smaller carbon/silicon ratio relative to the domain precursor and a larger oxygen/silicon ratio relative to the domain precursor, where the at least a portion of the unreacted domain precursor is the first domain (layer). The first domain (layer) may be referred to as a non-oxidized domain or a non-oxidized layer and the second domain (layer) may be referred to as an oxidized domain or an oxidized layer. Without intending to be bound by any particular theory, a portion of the first layer may be partially oxidized, but less oxidized than the second domain.

In various embodiments, the silicon to oxygen ratio and/or silicon to carbon ratio of the membrane change along at least a portion of or all of a dimension of the membrane (e.g., along at least a portion of or all of the long axis of the membrane (the axis corresponding to the thickness of the membrane)). For example, the silicon to oxygen ratio and/or silicon to carbon ratios form a gradient. In such an example, the silicon to oxygen ratio forms a gradient where the silicon to oxygen ratio decreases from a surface of the second layer to an opposite surface of the first layer. Similarly, in the same example, the silicon to carbon ratio forms a gradient where the silicon to carbon ratio increases from a surface of the second layer to an opposite surface of the first layer.

The carbon/silicon ratio may vary depending on the domain precursor used. A domain precursor or first domain may have a carbon/silicon ratio of 2-10 (e.g., 2, 3, 4, 5, 6, 7, 8, 9, or 10) or about 2-10. For example, a domain precursor is PDMS and has a carbon/silicon ratio of about 2 (e.g., 2) and the resulting first layer comprises PDMS and has a carbon/silicon ratio of about 1.5 to 2 (e.g., 1.5-2), including all 0.01 values and ranges therebetween.

The first layer of a membrane of the present disclosure may have various silicon to oxygen ratios and various silicon to carbon ratios. In various examples, the first layer has a silicon to oxygen ratio of about 4:1 to 1:1.25 (e.g., 4:1 to 1:1.25), including all 0.01 ratio values and ranges therebetween. In various examples, the membrane has a silicon to carbon ratio of about 1:2 to 1:10 (e.g., 1:2 to 1:10), including all 0.01 ratio values and ranges therebetween.

The second layer of a membrane of the present disclosure may have various silicon to oxygen ratios and various silicon to carbon ratios. In various examples, the second layer has a silicon to oxygen ratio of about 1:1 to 1:2 (e.g., 1:1 to 1:2), including all 0.1 ratio values and ranges therebetween. In various examples, the membrane has a silicon to carbon ratio of about 2:1 to 10:1 (e.g., 2:1 to 10:1), including all 0.1 ratio values and ranges therebetween.

The second layer may have various ratios of oxygen to silicon and/or carbon to silicon. The carbon/silicon ratio of the second layer is less than that of the domain precursor and/or first layer. For example, the second layer has a carbon/silicon ratio of about 0.25 to 4 (e.g., 0.25 to 4), including every 0.01 value and range therebetween. For example, if PDMS is the domain precursor (and thus the first layer comprises PDMS), the second lay may have an oxygen/silicon ratio greater than about 1.5 (e.g., greater than 1.5) and a carbon/silicon ratio less than about 1.5 (e.g., less than 1.5), and the first layer may have an oxygen/silicon ratio less than about 1.5 (e.g., 1) and a carbon/silicon ratio greater than about 1.5 (e.g., 2). In various examples, a portion of the second layer comprises silica and a portion of the first layer comprises PDMS.

In various examples, the structure and/or composition and/or one or more properties of the second layer are substantially similar (e.g., do not change by more than 5%, more than 4%, more than 3%, more than 2%, or more than 1%) along a dimension perpendicular to a longest dimension of the membrane (e.g., along a thickness of the membrane). In various other examples, the structure and/or composition and/or one or more properties of the membrane vary (in a linear or non-linear manner) along at least a portion of or all of a dimension perpendicular to a longest dimension of the membrane or layer of the membrane (e.g., along a thickness of the membrane or layer of the membrane).

At least a portion (e.g., a portion or all of) of the polymer chains of the membrane are crosslinked. The crosslinking may be intrachain crosslinking, interchain crosslinking, or a combination thereof. For example, the crosslinks result from reacting (e.g., etching) a silicon-based polymer (e.g., PDMS) with plasma (e.g., oxygen plasma), which results in formation of intrachain and/or interchain —Si—O— bonds and/or —Si—C— bonds.

The membrane can have various sizes, such as thickness, lengths, and areas. The thickness of the second layer may affected by the depth of plasma etching of the domain precursor. The second layer may have a thickness of 0.1 to 50 nm, including every 0.1 nm value and range therebetween (e.g., 0.1, 0.5, 1, 2, 3, 4, 5, 6, 7, 8, 9, 10, 11, 12, 13, 14, 15, 16, 17, 18, 19, 20, 21, 22, 23, 24, or 25 nm). The first layer may have a thickness of 100 nm to 10 μm, including 0.1 nm value and range therebetween (e.g., 100 nm to 1 μm or 100 nm to 5 μm). In various other examples, the membrane is 5 nm to 1000 nm, including every 0.1 nm value and range therebetween. In various examples, the membrane has an area of 1 $cm^2$ or above.

In various examples, at least a portion of (e.g., at least a portion of or all of one side) the first layer has the second layer disposed thereon. The first layer (or domain precursor) may be a film. An organosilica membrane (e.g., second layer) may be disposed on at least a portion (e.g., at least a portion of or all of one side) of a film (e.g., first layer) comprising a plurality of polymer chains (e.g., non-cross-linked polymer chains) comprising a plurality of silicon-oxygen groups and a plurality of silicon-carbon groups (e.g., polymer chains that are not cross-linked and/or have not been subjected to plasma treatment).

The first layer may be disposed on a variety of porous substrates (e.g., porous substrate, which, for example, may be porous polymer membranes). The first layer may be disposed on at least a portion of (e.g., a portion of or all of) a porous substrate or the porous substrate may have the first layer disposed thereon. The porous substrates may be porous polymeric membranes or inorganic membranes. The substrate may have a thickness of 10 μm to 200 μm, including every 1 nm value and range therebetween. Without intending to be bound by any particular theory, the substrate is considered to provide mechanical stability (e.g., support) to the membrane. A variety of substrates are known in the art. Non-limiting examples of polymeric substrates (e.g., porous polymer membranes) include polysulfones, polyether sulfones, polyamides, polyimides, polyetherimides, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), Sulfonated poly (xylylene oxide), polyguinoxaline, polyamideimides, polyamide esters, blends thereof, copolymers thereof, substituted materials/derivatives/analogues thereof, and the like, and combinations thereof. Non-limiting examples of inorganic substrates (e.g., porous inorganic membranes) include zeolites. The substrate may be a hollow fiber or flat sheet membrane. A membrane of the present disclosure may be disposed on at least a portion of an exterior surface of the hollow fiber or flat sheet membrane.

A membrane of the present disclosure has various mechanical properties. For example, the elastic modulus of the second layer is larger than the elastic modulus of the first layer and/or domain precursor. The elastic modulus of the second layer may be 1 MPa to 50 MPa, including all 0.1 MPa values and ranges therebetween.

A composite article or membrane of the present disclosure exhibit one or more desirable properties. A composite article or membrane may have a hydrogen to other gas (such as, for example, nitrogen, argon, carbon monoxide, carbon dioxide, hydrocarbon (e.g., methane, ethane, propane, butane, pentane, and the like)) permeability ratio of about 10:1 to about 100:1 (e.g., 10:1 to 100:1), including all 0.1 ratio values and ranges therebetween. A composite article or membrane may also have a helium to other gases (such as, for example, nitrogen, argon, carbon monoxide, carbon dioxide, hydrocarbon (e.g., methane, ethane, propane, butane, pentane, and the like)) permeability ratio of about 10:1 to about 200:1 (e.g., 10:1 to 200:1), including all 0.1 ratio values and ranges therebetween. A composite article or membrane may have a hydrogen and/or helium permeance of 50 GPU (1 GPU=$3.347\times10^{-10}$ mol $m^{-2}$ $s^{-1}$ $Pa^{-1}$=$10^{-6}$ $cm^3$ (STP) $cm^{-2}$ $s^{-1}$ $cmHg^{-1}$) to 2000 GPU, including all 0.1 values and ranges therebetween.

In an aspect, the present disclosure provides a method of forming a composite article of the present disclosure. The method comprises disposing a domain a precursor (of the present disclosure) on a porous substrate, where the domain precursor has silicon to oxygen ratio of about 4:1 to about 1:1.25 (e.g., 4:1 to 1:1.25), including every 0.01 ratio value and range therebetween, and a silicon to carbon ratio of about 1:2 to about 1:10 (e.g., 1:2 to 1:10), including every 0.01 ratio value and range therebetween; plasma (e.g., oxygen plasma) treating the domain precursor, wherein the plasma treating results in the formation of an oxidized second domain (second layer) and a non-oxidized or substantially non-oxidized first domain (first layer).

In various examples, the first layer and second layer are formed from a domain precursor via oxidation with plasma (e.g., oxygen plasma). The domain precursor comprises one or more silicon-containing polymers further comprising oxygen and carbon. For example, a portion of a surface of the domain precursor is reacted (e.g., etched) with plasma (e.g., oxygen plasma), a second layer is formed having a smaller carbon/silicon ratio relative to the domain precursor and a larger oxygen/silicon ratio relative to the domain precursor, where at least a portion of the unreacted domain precursor is the first layer. Without intending to be bound by any particular theory, a portion of the first layer may be partially oxidized, but less oxidized than the second layer.

In various examples, a film (e.g., a domain precursor) comprising a plurality of polymer chains (e.g., non-cross-linked polymer chains) comprising a plurality of silicon-oxygen groups and a plurality of silicon-carbon groups (e.g., polymer chains that are not cross-linked and/or have not been subjected to plasma treatment), where the membrane (e.g., the organosilica membrane of the present disclosure) is formed.

Various polymer chains comprising a plurality of silicon-oxygen groups and a plurality of silicon-carbon groups may be used. Non-limiting examples are Si-containing polymers (such as, for example, polydimethylsiloxane (PDMS) and the like), Si-containing polymer blends, polymers doped by Si-containing chemicals, and the like, and combinations thereof. Non-limiting examples are Si-containing polymers (such as, for example, polydimethylsiloxane (PDMS) and the like), Si-containing polymer blends, polymers doped by Si-containing chemicals, and the like, and combinations thereof. Examples of Si-containing polymers include, but are not limited to, polysiloxanes, polysilanes, polysilazanes, polycarbosilanes, and polysilphenylenes. Non-limiting examples of polysiloxanes include polydimethylsiloxane, polydiethylsiloxane, polyethylmethylsiloxane, polyoctylmethylsiloxane, polytetradecylmethylsiloxane, poly(methylhydrosiloxane), poly(methylphenylsiloxane), poly(dimethylsiloxane-co-alkylmethylsiloxane), poly(dimethylsiloxane-co-diphenylsiloxane), and the like, and combinations thereof. Additional examples of Si-containing polymers (e.g., polysiloxanes) are polysiloxanes commercially obtained from Gelest, Inc.

Etching with plasma may result in crosslinking of the polymers of the membrane. In various examples, at least a portion of (e.g., a portion of or all) of the polymers of the second domain are crosslinked. The crosslinks may be intrachain or interchain.

In various examples, domain precursor is disposed on a porous substrate prior to plasma etching. Thus, a method further comprising coating at least a portion of (e.g., a portion or all of) a surface of a porous substrate with a domain precursor. Methods of coating are known in the art. For example, the porous substrate may be coated via dip-coating.

The plasma has various properties. For example, the plasma has a power of at least 10 watts and/or the plasma is formed from pure oxygen. In various other embodiments, the plasma is formed from a mixture of gases where at least 5% of the mixture is oxygen (e.g., the remainder of may be other gases, such as, for example, helium, nitrogen, argon, xenon, and the like, combinations thereof). The plasma treating may be carried out on a discrete domain precursor (e.g., a discrete film) or in a continuous process (e.g., a roll-to-roll process).

The plasma treatment may be performed for various amounts of time. The amount of time the domain precursor is treated with plasma affects the thickness of the second layer, the carbon/silicon ratio of the second layer, and the oxygen/silicon ratio of the first layer. In various examples, the domain precursor is treated with plasma for at least about 10 seconds.

In an aspect, the present disclosure provides devices comprising a composite article of the present disclosure or membrane (e.g., an organosilica membrane of the present disclosure). The device may be a gas separation device or a liquid separation device.

In various examples, the gas separation device is configured to separate helium gas and/or hydrogen gas from one or more hydrocarbon gas(es). In various examples, the liquid separation device is configured as a nanoseparation device to treat liquid mixtures.

In an aspect, the present disclosure provides a gas separation method.

The gas separation method may comprise: contacting a gas sample comprising i) hydrogen and/or helium, and ii) carbon monoxide and/or carbon dioxide and/or one or more hydrocarbon(s) with a composite article of the present disclosure, a membrane of the present disclosure (e.g., an organosilica membrane) of the present disclosure, a composite article of the present disclosure made by a method of the present disclosure and/or a device of the present disclosure, where at least a portion or all of the hydrogen and/or helium is separated from at least a portion or all of the carbon monoxide and/or the one or more hydrocarbon(s). The method may be performed at a temperature of −20° C. to 100° C., including every 0.01° C. value and range therebetween. The ratio of separated i) hydrogen to ii) carbon monoxide and/or carbon dioxide and/or one or more hydrocarbon(s) may be about 10:1 to about 100:1 (e.g., 10:1 to about 100:1), including every 0.1 ratio value and range therebetween. The ratio of separate i) helium to ii) carbon monoxide and/or carbon dioxide and/or one or more hydrocarbon(s) may be about 10:1 to about 200:1 (e.g., 10:1 to 200:1), including every 0.1 ratio value and range therebetween.

The steps of the method described in the various embodiments and examples disclosed herein are sufficient to carry out the methods of the present disclosure. Thus, in an embodiment, the method consists essentially of a combination of the steps of the methods disclosed herein. In another embodiment, the method consists of such steps.

The following Statements are various examples and embodiments of the present disclosure.

Statement 1. An organosilica membrane comprising a plurality of polymer chains comprising a plurality of silicon-oxygen groups and a plurality of silicon-carbon groups, the membrane having a silicon to oxygen ratio of 1:1 to 1:2, including all 0.1 ratio values and ranges therebetween; a silicon to carbon ratio of 2:1 to 10:1, including all 0.1 ratio values and ranges therebetween; and at least a portion of the polymer chains are crosslinked (e.g., intrachain crosslinked, interchain crosslinked, or a combination thereof). For example, the crosslinks result from formation of intrachain and/or interchain —Si—O— bonds and/or —Si—C-bonds.

Statement 2. An organosilica membrane according to Statement 1, where the membrane has a thickness of 5 nm to 1,000 nm, including every nm value and range therebetween.

Statement 3. An organosilica membrane according to Statements 1 or 2, where the membrane has an area of 1 $cm^2$ or above.

Statement 4. An organosilica membrane according to any one of the preceding Statements, where the plurality of polymer chains comprising a plurality of silicon-oxygen groups and a plurality of silicon-carbon groups are chosen from Si-containing polymers (such as, for example, polydimethylsiloxane or PDMS and the like), Si-containing polymer blends, polymers doped by Si-containing chemicals, and combinations thereof.

Statement 5. An organosilica membrane according to any one of the preceding Statements, where some or all of the polymer chains are uncrosslinked or crosslinked.

Statement 6. An organosilica membrane according to any one of the preceding Statements, where the organosilica membrane is disposed on at least a portion (e.g., at least a portion of or all of one side) of a film comprising a plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment) and the film comprising the plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment) is disposed on at least a portion (e.g., at least a portion of or all of one side) of a porous polymer membrane.

Statement 7. An organosilica membrane according to Statement 6, where the plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment) are chosen from Si-containing polymers (such as, for example, PDMS and the like), Si-containing polymer blends, polymers doped by Si-containing chemicals, and combinations thereof.

Statement 8. An organosilica membrane according to Statements 6 or 7, where the film comprising the plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment) has a thickness of 100 nm to 10 μm, including every nm value and range therebetween.

Statement 9. An organosilica membrane according to any one of Statements 6-8, where the porous polymer membrane is chosen from polysulfones, polyether sulfones, polyamides, polyimides, polyetherimides, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), Sulfonated poly(xylylene oxide), polyguinoxaline, polyamideimides, polyamide esters, blends thereof, copolymers thereof, substituted materials/derivatives/analogues thereof, and the like, and combinations thereof.

Statement 10. An organosilica membrane according to any one of Statements 6-9, where the porous polymer film has a thickness of 10 μm to 200 μm, including every nm value and range therebetween.

Statement 11. An oragnosilica membrane according to any one of the preceding Statements, where the membrane is disposed on at least a portion of an exterior surface of a hollow fiber or flat sheet membrane.

Statements 12. An organosilica membrane according to any one of the preceding Statements, where i) the structure and/or composition and/or one or more properties of the organosilica membrane are substantially similar (e.g., do not change by more than 5%, more than 4%, more than 3%, more than 2%, or more than 1%) along a dimension perpendicular to a longest dimension of the membrane (e.g., along a thickness of the membrane), or ii) the structure and/or composition and/or one or more properties of the organosilica membrane vary (in a linear or non-linear manner) along at least a portion of or all of a dimension perpendicular to a longest dimension of the membrane (e.g., along a thickness of the membrane).

Statement 13. An organosilica membrane according to any one of the preceding Statements, wherein the membrane exhibits one or more or all of the following: (i) hydrogen to other gases (such as, for example, nitrogen, argon, carbon monoxide, carbon dioxide, hydrocarbon (e.g., methane, ethane, propane, butane, pentane, and the like)) permeability ratio of 10:1 to 100:1, including all 0.1 ratio values and ranges therebetween; and/or (ii) helium to other gases (such as, for example, nitrogen, argon, carbon monoxide, carbon dioxide, hydrocarbon (e.g., methane, ethane, propane, butane, pentane, and the like)) permeability ratio of 10:1 to 100:1, including all 0.1 ratio values and ranges therebetween.

Statement 14. A method of forming an organosilica membrane comprising: plasma treating a film comprising a plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment), where the organosilica membrane (e.g., the organosilica membrane of any one of Statements 1-13) is formed.

Statement 15. A method according to Statement 14, where the plasma has one or more or all of the following: (i) a power of at least 10 Watt; and/or (ii) is formed from pure oxygen or mixtures containing oxygen of 5% or above and other gases (such as, for example helium, nitrogen, argon, xenon, and the like, combinations thereof).

Statement 16. A method according to Statements 14 or 15, where the plasma treating is carried out for at least 10 seconds.

Statement 17. A method according to any one of Statements 14-16, where the plasma treating is carried out on a discrete film or in a continuous process (e.g., a roll-to-roll process).

Statement 18. A method according to any one of Statements 14-17, where the plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment) are chosen from Si-containing polymers (such as, for example, polydimethylsiloxane or PDMS and the like), Si-containing polymer blends, polymers doped by Si-containing chemicals, and combinations thereof.

Statements 19. A device comprising one or more organosilica membrane(s) of any one of Statements 1-13 and/or one or more organosilica membranes made by a method of any one of Statements 14-18.

Statement 20. A device according to Statement 19, where the device is a gas separation device or a liquid separation device.

Statement 21. A device according to Statement 20, where the gas separation device is configured to separate helium gas and/or hydrogen gas from one or more hydrocarbon gas(es).

Statement 22. A device according to Statement 19, where the liquid separation device is configured as a nanoseparation device.

Statement 23. A gas separation method, comprising: contacting a gas sample comprising hydrogen and/or helium and carbon monoxide and/or one or more hydrocarbon(s) with an organosilica membrane of any one of Statements 1-13 and/or an organosilica membrane made by a method of any one of Statements 14-18 and/or a device of any one of Statements 19-21; where at least a portion or all of the hydrogen and/or helium is separated from at least a portion or all of the carbon monoxide and/or the one or more hydrocarbon(s).

Statement 24. A method according to Statement 23, where the method is carried out at a temperature of −20° C. to 100° C., including every 0.01° C. value and range therebetween.

Statement 25. A composite article comprising a porous substrate and a membrane, wherein the membrane comprises a first layer and a second layer, where at least a portion of (e.g., at least a portion of or all of) the porous substrate has the first layer disposed thereon and at least a portion of (e.g., at least a portion of or all of) the first layer has the second layer disposed thereon, the first layer comprises a plurality of polymer chains comprising a plurality of silicon-oxygen groups and a plurality of silicon-carbon groups and the first layer has a silicon to oxygen ratio of about 4:1 to about 1:1.25 (e.g., 4:1 to 1:1.25), including every 0.01 ratio value and range therebetween, and a silicon to carbon ratio of about 1:2 to about 1:10 (e.g., 1:2 to 1:10), including every 0.01 ratio value and range therebetween; and the second layer comprises a plurality of polymer chains comprising a plurality of silicon-oxygen groups and a plurality of silicon-carbon groups and the second layer having a silicon to oxygen ratio of about 1:1 to about 1:2 (e.g., 1:1 to 1:2), including every 0.01 ratio value and range therebetween; a silicon to carbon ratio of about 2:1 to about 10:1 (e.g., 2:1 to 10:1), including every 0.01 ratio value and range therebetween; and at least a portion of (e.g., at least a portion of or all of) the polymer chains of the second layer are crosslinked (e.g., intrachain crosslinked, interchain crosslinked, or a combination thereof). For example, the crosslinks result from formation of intrachain and/or interchain —Si—O— bonds and/or —Si—C— bonds.

Statement 26. A composite article according to Statement 25, where the second layer has a thickness of 0.1 nm to 50 nm, including every 0.1 nm value and range therebetween.

Statement 27. A composite article according to Statements 25 or 26, where the membrane and/or composite article has an area of 1 $cm^2$ or above.

Statement 28. A composite article according to any one of Statements 25-27, where the plurality of polymer chains (e.g., non-crosslinked polymer chains) comprising a plurality of silicon-oxygen groups and a plurality of silicon-carbon groups of the first layer (e.g., polymer chains that are not cross-linked and/or have not been subjected to plasma treatment) are chosen from Si-containing polymers, Si-containing polymer blends, polymers doped by Si-containing chemicals, and the like, and combinations thereof.

Statement 29. A composite article according to Statement 28, where the Si-containing polymers are chosen from polysiloxanes, polysilanes, polysilazanes, polycarbosilanes, polysilphenylenes, and combinations thereof.

Statement 30. A composite article according to any one of Statements 25-29, where the first layer comprises polydimethylsiloxane, polydiethylsiloxane, polyethylmethylsiloxane, polyoctylmethylsiloxane, polytetradecylmethylsiloxane, poly(methylhydrosiloxane), poly(methylphenylsiloxane), poly(dimethylsiloxane-co-alkylmethylsiloxane), poly(dimethylsiloxane-co-diphenylsiloxane), and the like, and combinations thereof.

Statement 31. A composite article according to any one of Statements 25-30, where the first layer has a thickness of 100 nm to 5 μm, including all 0.1 nm values and ranges therebetween.

Statement 32. A composite article according to any one of Statements 25-31, where the porous substrate is a polymeric material (e.g., a polymeric material chosen from polysulfones, polyether sulfones, polyamides, polyimides, polyetherimides, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyguinoxaline, polyamideimides, polyamide esters, blends thereof, copolymers thereof, substituted materials/derivatives/analogues thereof, and the like, and combinations thereof, or an inorganic material (e.g., zeolites), or the like, or a combination thereof.

Statement 33. A composite article according to any one of Statements 25-32, where the porous substrate has a thickness of 10 μm to 200 μm, including all 0.1 nm values and ranges therebetween.

Statement 34. A composite article according to any one of Statements 25-33, where the membrane is disposed on at least a portion of an exterior surface of a hollow fiber or flat sheet membrane.

Statement 35. A composite article according to any one of Statements 25-34, where the composite article and/or membrane has a hydrogen to other gas(es) (such as, for example, nitrogen, argon, carbon monoxide, carbon dioxide, hydrocarbon (e.g., methane, ethane, propane, butane, pentane, and the like)) permeability ratio of about 10:1 to about 100:1 (e.g., 10:1 to 100:1), including all 0.1 ratio values and ranges therebetween; and/or helium to other gas(es) (such as, for example, nitrogen, argon, carbon monoxide, carbon dioxide, hydrocarbon (e.g., methane, ethane, propane, butane, pentane, and the like)) permeability ratio of about 10:1 to about 200:1 (e.g., 10:1 to 200:1), including all 0.1 ratio values and ranges therebetween.

Statement 36. A composite article according to any one of Statements 25-34, where i) the structure and/or composition and/or one or more properties of the composite article and/or membrane is/are substantially similar (e.g., do not change by more than 5%, more than 4%, more than 3%, more than 2%, or more than 1%) along a dimension perpendicular to a longest dimension of the membrane or layer of a membrane (e.g., along a thickness of the membrane), or ii) the structure and/or composition and/or one or more properties of the membrane vary (in a linear or non-linear manner) along at least a portion of or all of a dimension perpendicular to a longest dimension of the membrane or layer of a membrane (e.g., along a thickness of the membrane).

Statement 37. A method of forming a composite article comprising: disposing (e.g., coating (e.g., dip-coating) or applying) a domain precursor comprising a plurality of polymer chains (e.g., non-crosslinked polymer chains) comprising a plurality of silicon-oxygen groups and a plurality of silicon-carbon groups (e.g., polymer chains that are not cross-linked and/or have not been subjected to plasma treatment) on a porous substrate and the domain precursor has a silicon to oxygen ratio of about 4:1 to about 1:1.25 (e.g., 4:1 to 1:1.25), including every 0.01 ratio value and range therebetween, and a silicon to carbon ratio of about 1:2 to about 1:10 (e.g., 1:2 to 1:10), including every 0.01 ratio value and range therebetween; and plasma treating a domain precursor, where the composite article according to any one of Statements 25-36 is formed.

Statement 38. A method according to Statement 37, where the domain precursor is chosen from Si-containing polymers, Si-containing polymer blends, polymers doped by Si-containing chemicals, and combinations thereof.

Statement 39. A method according to Statement 38, where the Si-containing polymers are chosen from polysiloxanes, polysilanes, polysilazanes, polycarbosilanes, polysilphenylenes, and combinations thereof.

Statement 40. A method according to any one of Statements 37-39, where the domain precursor is chosen from polydimethylsiloxane, polydiethylsiloxane, polyethylmethylsiloxane, polyoctylmethylsiloxane, polytetradecylmethylsiloxane, poly(methylhydrosiloxane), poly(methylphenylsiloxane), poly(dimethylsiloxane-co-alkylmethylsiloxane), poly(dimethylsiloxane-co-diphenylsiloxane), and the like, and combinations thereof.

Statement 41. A method according to any one of Statements 37-40, where the plasma has a power of at least 10 Watt and/or is formed from pure oxygen or a gas mixture comprising at least 5% oxygen (e.g., the mixture further comprises one or more of the following: helium, nitrogen, argon, xenon, and the like).

Statement 42. A method according to any one of Statements 37-41, where the plasma treating is carried out for at least 10 seconds.

Statement 43. A method according to any one of Statements 37-42, where the plasma treating is carried out on a discrete film or in a continuous process (e.g., a roll-to-roll process).

Statement 44. A device comprising one or more composite article(s) according to any one of Statements 25-36 or one or more composite article(s) made by a method according to any one of Statements 37-43.

Statement 45. A device according to Statement 44, where the device is a gas separation device or a liquid separation device.

Statement 46. A device according to Statement 45, where the gas separation device is configured to separate helium gas and/or hydrogen gas from one or more hydrocarbon gas(es) (e.g., CO, $CO_2$, and the like, and combinations thereof).

Statement 47. A device according to Statement 45, where the liquid separation device is configured as a nanoseparation device.

Statement 48. A gas separation method, comprising: contacting a gas sample comprising i) hydrogen and/or helium, and ii) carbon monoxide and/or carbon dioxide and/or one or more hydrocarbon(s) with the composite article according to any one of Statements 25-36 or a device comprising according to any one of Statements 44-47; where at least a portion or all of the hydrogen and/or helium is separated from at least a portion or all of the carbon monoxide and/or carbon dioxide and/or the one or more hydrocarbon(s).

Statement 49. A method according to Statement 48, where the method is carried out at a temperature of −20° C. to 100° C.

Statement 50. A method according to Statements 48 or 49, where the ratio of separated i) hydrogen to ii) carbon monoxide and/or carbon dioxide and/or one or more hydrocarbon(s) is about 10:1 to about 100:1, or the ratio of separate i) helium to ii) carbon monoxide and/or carbon dioxide and/or one or more hydrocarbon(s) is about 10:1 to about 200:1.

The following example is presented to illustrate the present disclosure. It is not intended to be limiting in any matter.

Example 1

This example provides a description of membranes of the present disclosure and methods of making and using same.

Demonstrated herein is the rapid fabrication (within 6 minutes) of ultrathin silica membranes (≈6 nm) via oxygen plasma treatment of polydimethylsiloxane based thin-film composite membranes at 20° C. The resulting organosilica membranes exhibit $H_2$ permeance of 280-930 GPU (1 GPU=$3.347\times10^{-10}$ mol $m^{-2}$ $s^{-1}$ $Pa^{-1}$) and $H_2/CO_2$ selectivity of 93-32 at 200° C., far surpassing state-of-the-art membranes and Robeson's upper bound for $H_2/CO_2$ separation. When challenged with a 3-day simulated syngas test containing water vapor and a 340-day stability test at 200° C., the membrane shows stable separation performance. The robust $H_2/CO_2$ separation properties coupled with excellent scalability demonstrate the great potential of these organosilica membranes for economic $H_2$ production with minimal carbon emissions.

Described herein is a new concept in membrane gas separations that combines the processability of practical polymeric membranes with the performance of advanced inorganic membranes. Specifically, described is the preparation of polymeric organosilica (POSi) membranes comprising a few-nanometer silica film on top of a polydimethylsiloxane-(PDMS) based thin-film composite (TFC) membrane (FIG. 1*a*). The membranes are formed by oxygen plasma treatment of the PDMS film at 20° C. and demonstrate $H_2/CO_2$ selectivity of as high as 100, matching that of conventional silica membranes. The PDMS membrane support provides excellent mechanical properties and easy handling, similar to existing industrial gas separation membranes. By contrast, conventional silica membranes are primarily made from organic precursors (such as tetraethoxysilane and tetramethoxysilane) via sol-gel deposition (requiring a calcination step at 400-600° C.[10, 23]) or chemical vapor deposition (requiring decomposition of silanes at 500-600° C.[24]). Such steps are energy-intensive and require thermally stable ceramic substrates (e.g., porous alumina), making them expensive and non-scalable for industrial production.

The ability for PDMS to form silica membranes for high-temperature $H_2/CO_2$ separation was surprising.

Results and Discussion.

FIG. 1*a* illustrates the instant approach to form scalable silica membranes where polymer membrane fabrication is integrated with oxygen plasma treatment. FIG. 1*b* shows the preparation steps for the POSi membranes at 20° C. First, a porous polybenzimidazole (PBI) support (FIG. 6) was prepared via phase inversion on top of a flexible stainless-steel wire cloth. Second, a submicron PDMS layer is coated on top of the support to form a TFC membrane, which is stable at 200° C. because of the thermal stability of PBI and PDMS. Finally, oxygen plasma is applied to produce an ultrathin silica layer on the PDMS surface, following the simplified reaction scheme shown in FIG. 1*a*. The plasma is ignited in an oxygen flow at 6.7 Pa and 20° C., and the exposure time is varied from 15 to 360 s to achieve different POSi membrane structures. The obtained samples are denoted as POSix, where x is the plasma exposure time in seconds. FIG. 1*c* displays a cross-sectional scanning electron microscopy (SEM) image of a POSi120 membrane, where a porous support is overlaid with a 1 μm-thick PDMS and silica dense film. The silica layer is too thin to be distinguished from PDMS in the SEM image. As confirmed in-depth profiles discussed below, the silica layer gradually transitions to the unmodified PDMS. Such a graded thin film offers mechanical robustness by eliminating the mechanically weak interface present in typical bilayer configurations. The surface roughness of the plasma-treated PDMS was investigated by atomic force microscopy (AFM). The formation of the silica layer does not increase the surface roughness (FIGS. 7*a* and *b*). POSi120 exhibits a smooth surface with a roughness of 0.8 nm (FIG. 1*d*).

Figure 2:
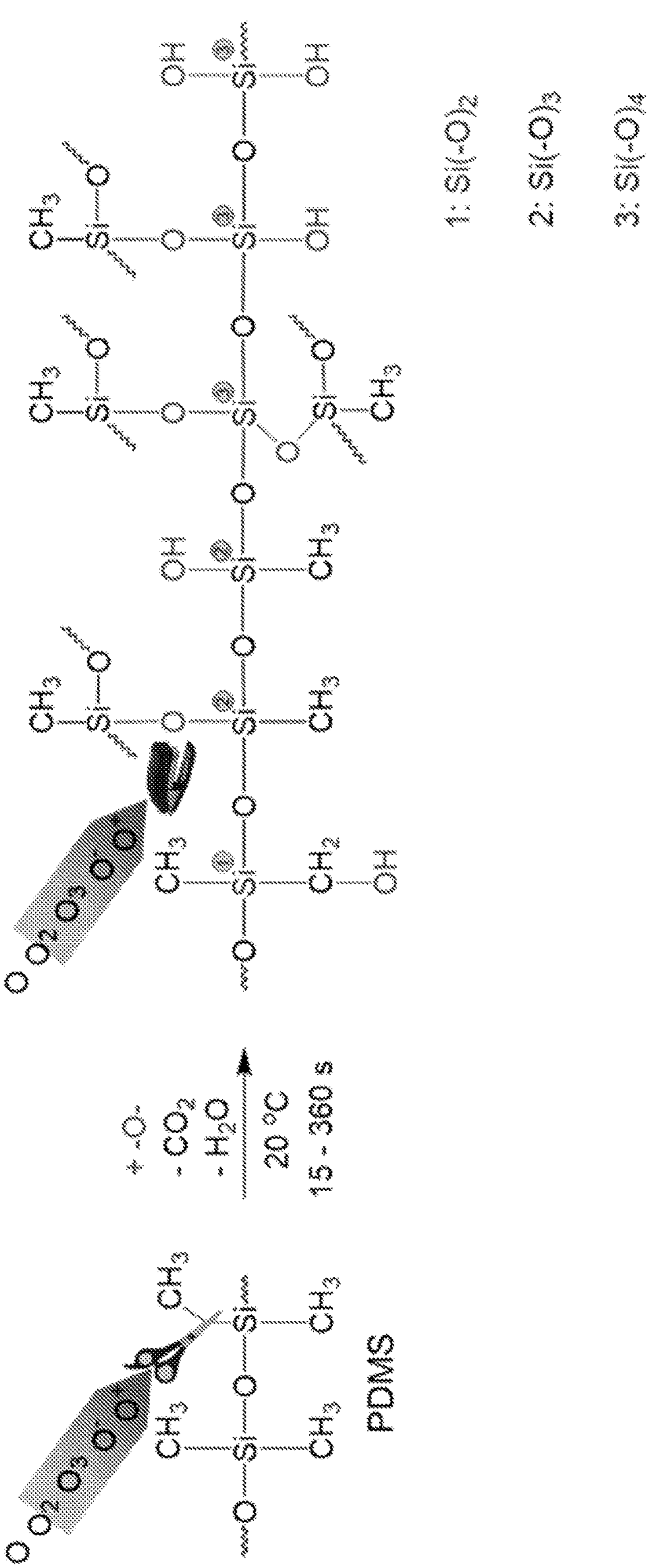
FIG. 2 shows a) simplified mechanism of oxidation and cross-linking of PDMS by oxygen plasma. b) The effect of oxygen plasma exposure time on Si concentration and C/Si and O/Si ratios at the PDMS surface. c) Resolved surface XPS spectra of Si 2p and C 1s peaks and d) O/Si ratio as a function of XPS depth profiling time or etch depth of the PDMS and POSi samples. e-g) AFM mapping of both surface topography (Z-axis of the 3D image) and nanoscale modulus (map with the scale bars presented on the right) for PDMS, POSi120, and POSi360 surfaces.
Figure 2:
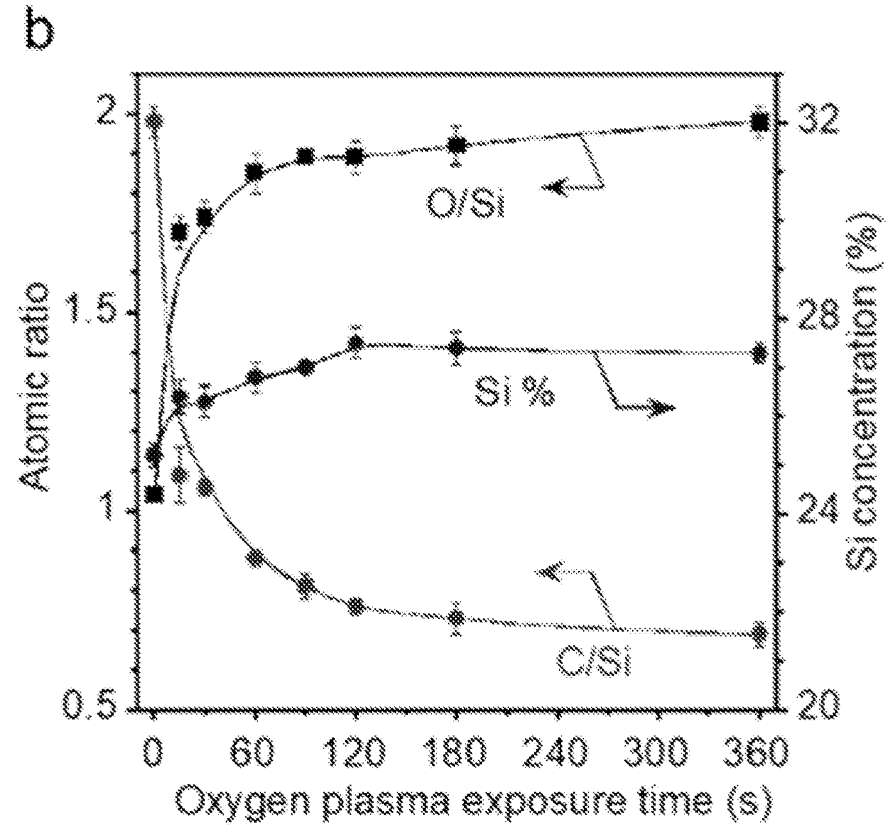
Figure 2:
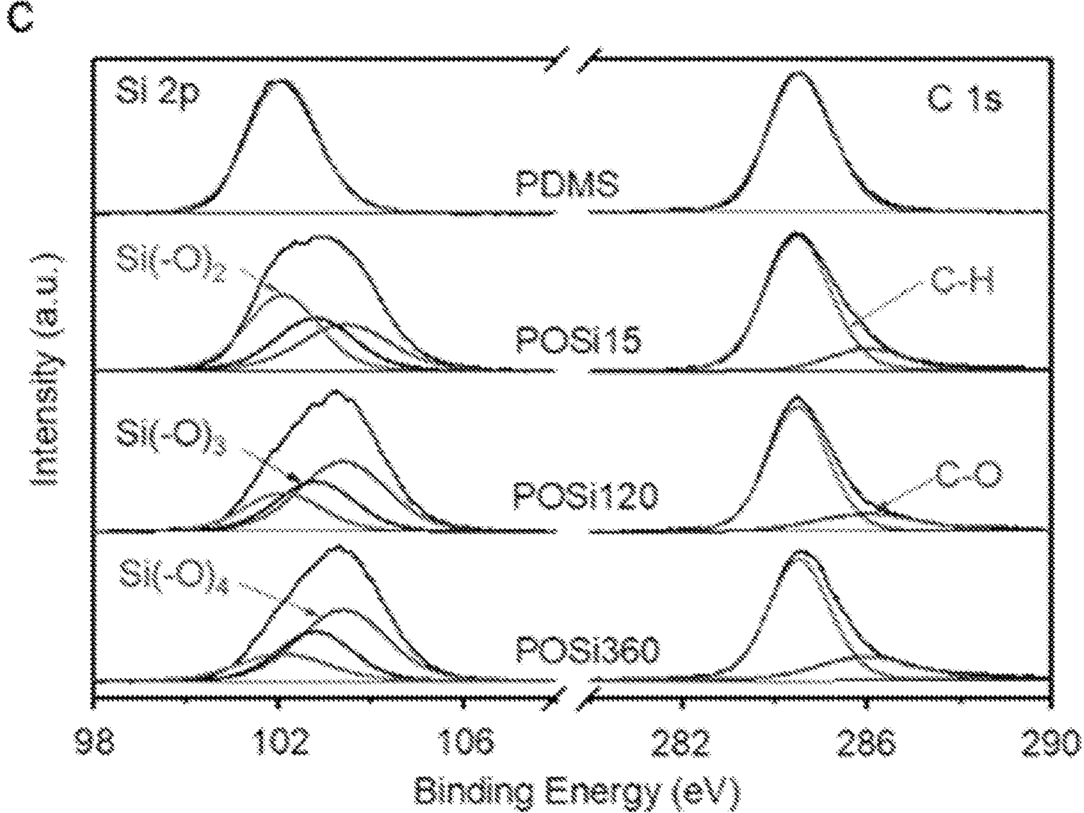
Figure 2:
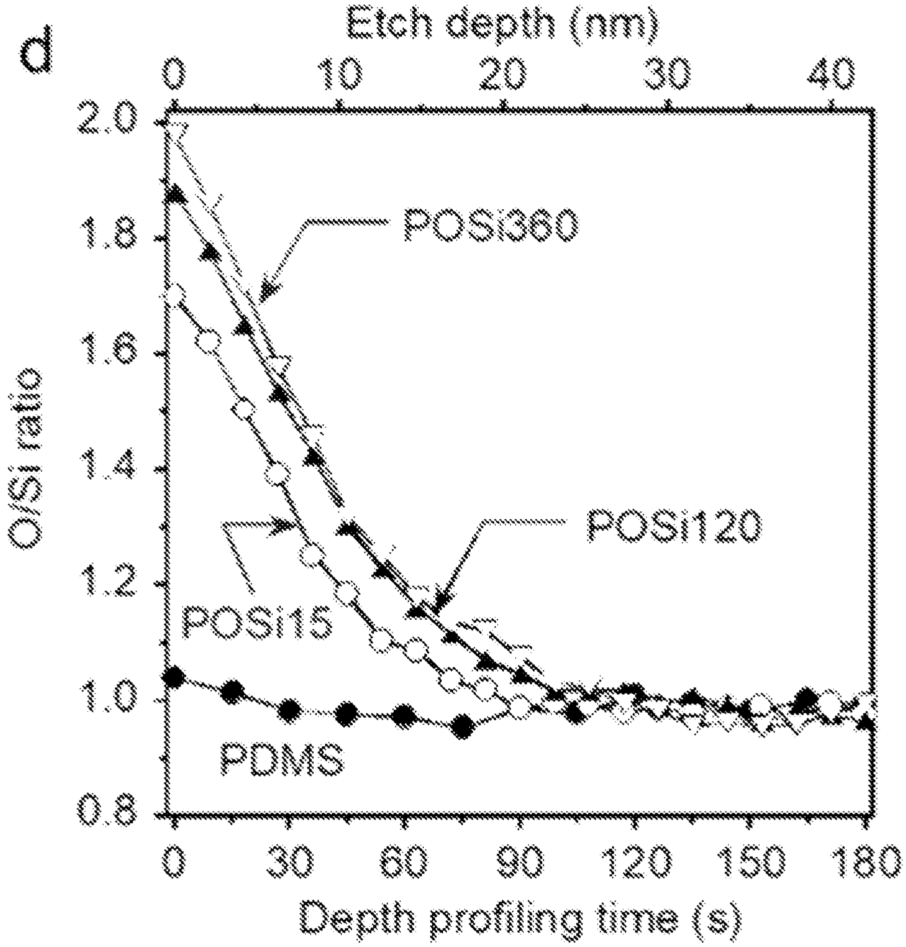
Figure 2:
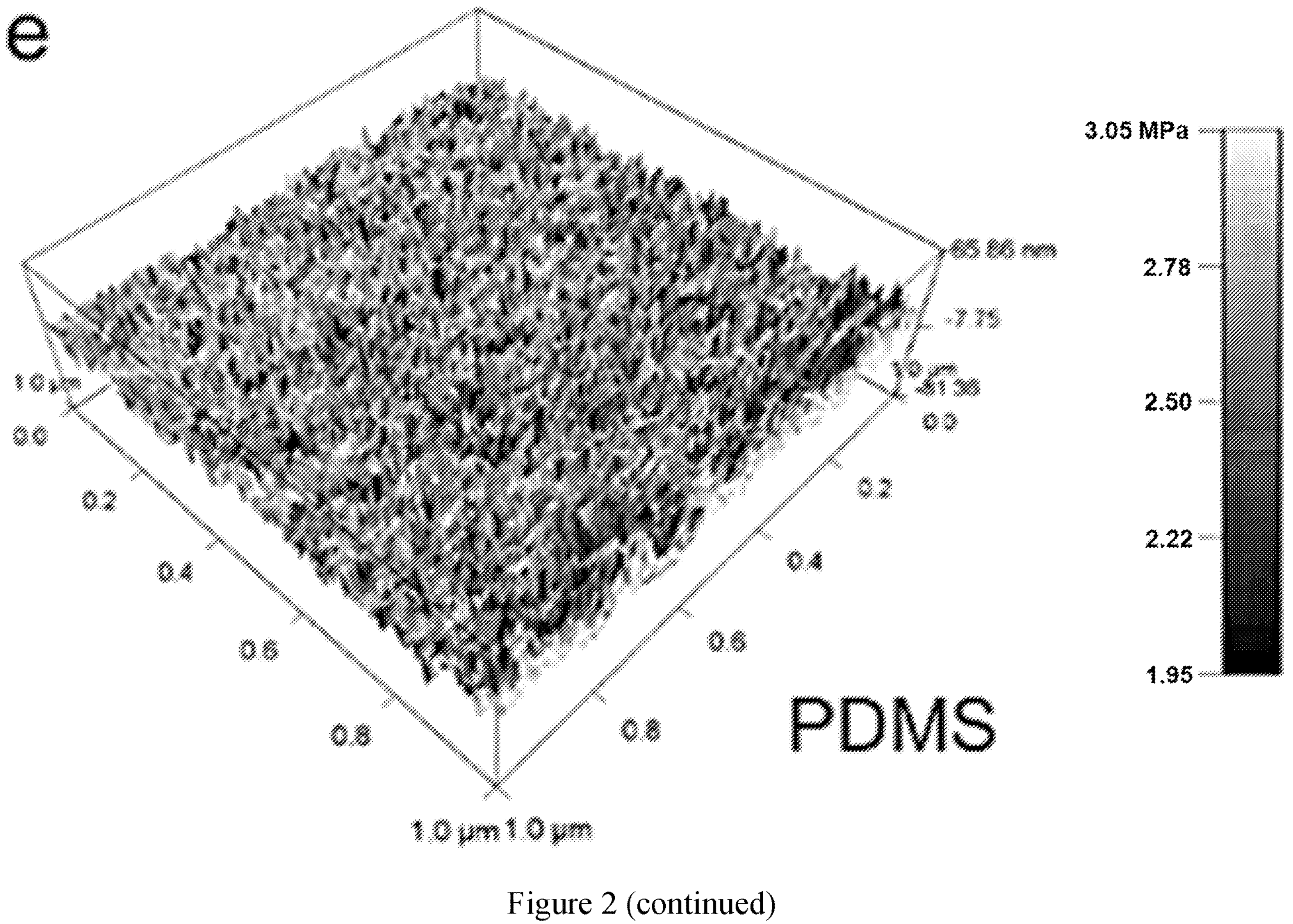
Figure 2:
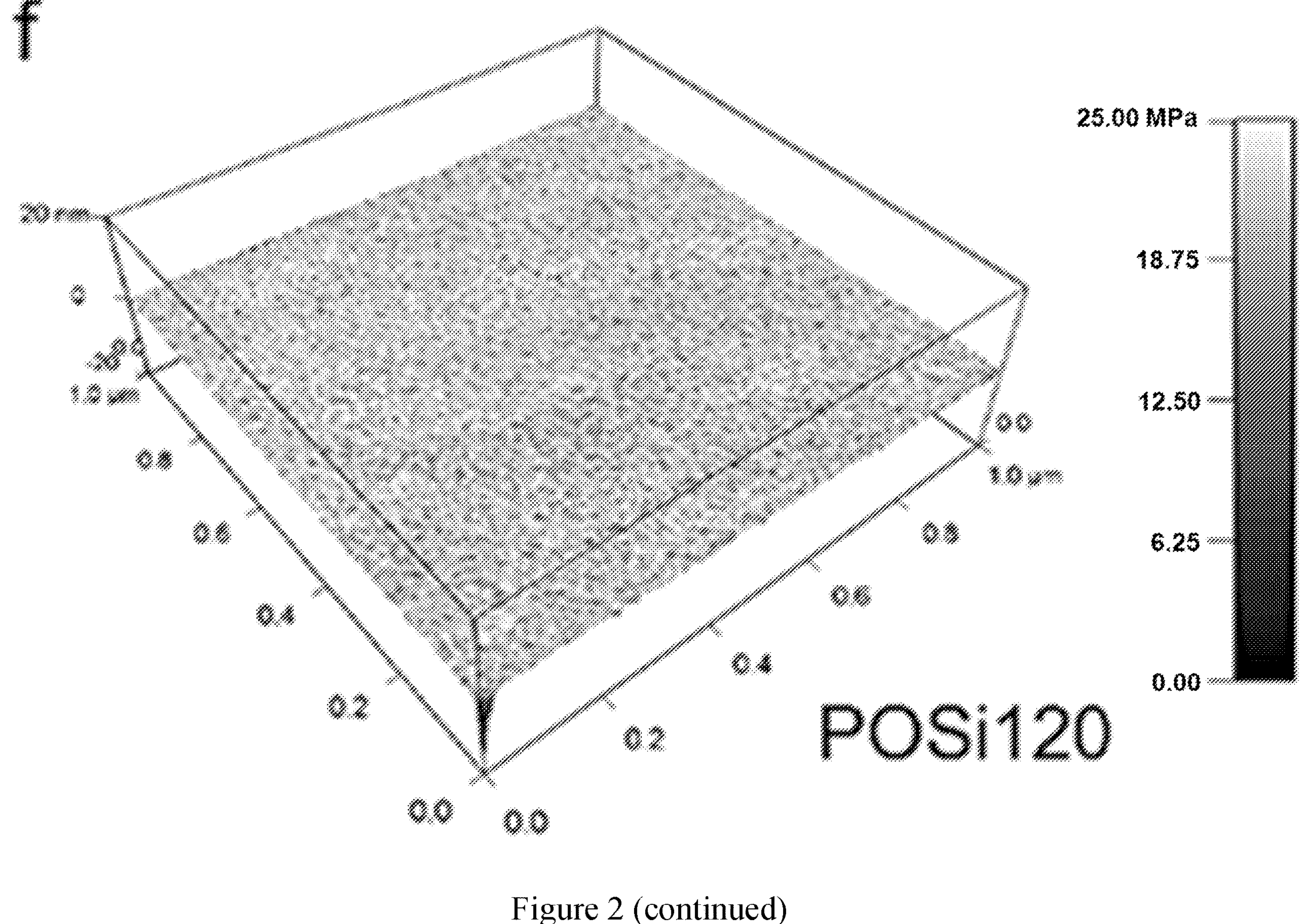
Figure 2:
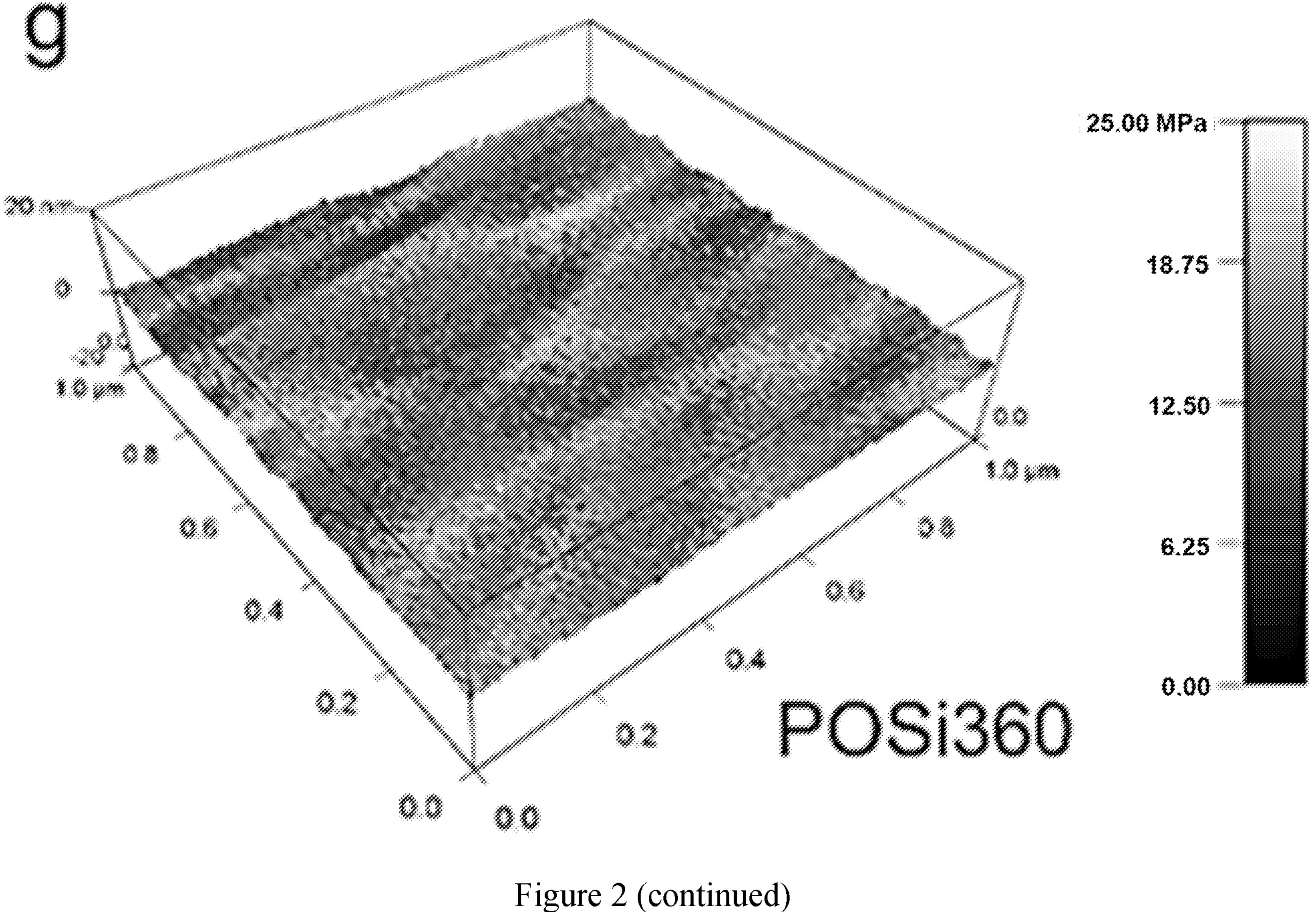

FIG. 2*a* reveals the reaction occurring on a PDMS surface in the presence of oxygen plasma species like $O^+$, $O^-$, O, $O_2$, and $O_3$. The oxygen plasma oxidizes and crosslinks PDMS chains, forming an organosilica surface layer consisting of silicon bonded to two $(Si(—O)_2)$, three $(Si(—O)_3)$, or four oxygen atoms $(Si(—O)_4$ or $SiO_2)$. Hydroxyl (—OH) and silanol (Si—OH) groups and interchain bonds (i.e., $Si(—O_3)$ or $Si(—O)_4$) are produced after oxidation and scission of methyl groups, and the resulting structures and chemical compositions depend on plasma conditions such as power, oxygen pressure, and treatment time.

X-ray photoelectron spectroscopy (XPS) was used to validate the formation of the organosilica on the PDMS surface. To avoid the interference from the porous substrate, PDMS films of 1 μm were coated on Si wafers and then exposed to the same oxygen plasma condition used for preparing POSi membranes. Increasing the plasma exposure time from 0 to 360 s increases the O/Si ratio, decreases the C/Si ratio, and has no effect on the Si content (25-27 mol %, FIG. 2*b*), confirming the oxidation and methyl scission reactions on PDMS. Noticeably, this oxygen plasma modification is so efficient that chemical compositions of PDMS begin to plateau just after 120 s treatment. For instance, the O/Si ratio reaches 1.0, 1.7, 1.9, and 2.0 at an exposure time of 0, 15, 120, and 360 s, respectively. The O/Si ratio of 2.0 indicates the complete conversion from PDMS to $SiO_2$ on the surface.

FIG. 2*c* compares Si 2p XPS spectra of the pristine PDMS and representative POSi samples. PDMS displays one characteristic peak at 102.1 eV, corresponding to Si bonded to two oxygens. By contrast, the complex Si 2p peaks of POSi can be resolved into three components: $Si(—O)_2$ at 102.1 eV, $(Si(—O)_3)$ at 102.8 eV, and $SiO_2$ at 103.4 eV. The amplitudes of the different Si peaks vary with the plasma exposure time. For example, increasing the plasma exposure time decreases the amplitude of Si(—O)$_2$ peak but significantly increases $SiO_2$ peak intensity. Table 1 summarizes the Si distribution among different chemical states obtained by deconvolution of those Si 2p peaks. For instance, POSi120 has 12.5 mol % Si(—O)$_2$, 25.3 mol % Si(—O)$_3$, and 62.2 mol % $SiO_2$, indicating that the oxygen plasma converts the PDMS chains to a silica-rich structure on the surface. FIG. 2*c* also compares the resolved C is XPS spectra of the PDMS and POSi samples. The PDMS surface presents only a C—H bond at 284.6 eV. By contrast, the POSi samples exhibit both C H and C—O (at 286.0 eV) bonds, confirming the oxidation of the pendant methyl groups of the PDMS chains. Increasing the plasma exposure time from 0 to 120 s substantially increases the C—O content from 0 to 20.2% (Table 1).

The XPS depth profiling technique was employed to determine the thickness of the organosilica layer in POSi samples. During depth profiling, a 2.1 nm-thick layer was milled away by a calibrated argon sputtering, and then the XPS detector analyzed the newly exposed surface after each sputtering. More than 20 cycles were repeated for each specimen. FIG. 2*d* plots the O/Si ratio as a function of the depth profiling time and etching depth. PDMS shows the O/Si ratio of 1.00±0.02, consistent with its theoretical O/Si ratio of 1, and any O/Si ratio over 1 indicates the presence of the oxidized PDMS. The O/Si ratio of POSi samples decreases with increasing etching depth, from a range of 1.7-2.0 to a value of 1.0 at the 25 nm depth and beyond, indicating the oxidized PDMS layer is 25 nm-thick. Within the oxidized PDMS, the densest structure with an O/Si ratio greater than 1.5 would primarily perform the molecular sieving for gas separation. The highly densified PDMS or organosilica layer was determined to be ca. 4.2, 6.3 and 8.4 nm for POSi15, POSi120, and POSi360, respectively.

The effect of plasma treatment on nanoscale mechanical properties of PDMS was examined by AFM in a fast-force mapping mode. The pristine PDMS is soft and only shows an elastic modulus of 2.5±0.5 MPa (FIG. 2*e*), similar to its bulk modulus (2.6 MPa). By contrast, the elastic modulus of POSi120 increases to 22±1 MPa (FIG. 20, almost one order magnitude higher than that of PDMS due to the formation of a silica layer. The elastic modulus of POSi360 is also higher than the pristine PDMS but shows a non uniform surface in terms of a large modulus range of 10-25 MPa (FIG. 2*g*), which can be ascribed to topographic convolution from the wavy surface caused by the high plasma exposure time (FIGS. 7*c* and *d*). Additionally, the measurement tends to underestimate the true modulus because AFM indentation depth is on the order of 100 nm, so the stress fields from the AFM tip extend considerably beyond the ultrathin organosilica layer.

Figure 3:
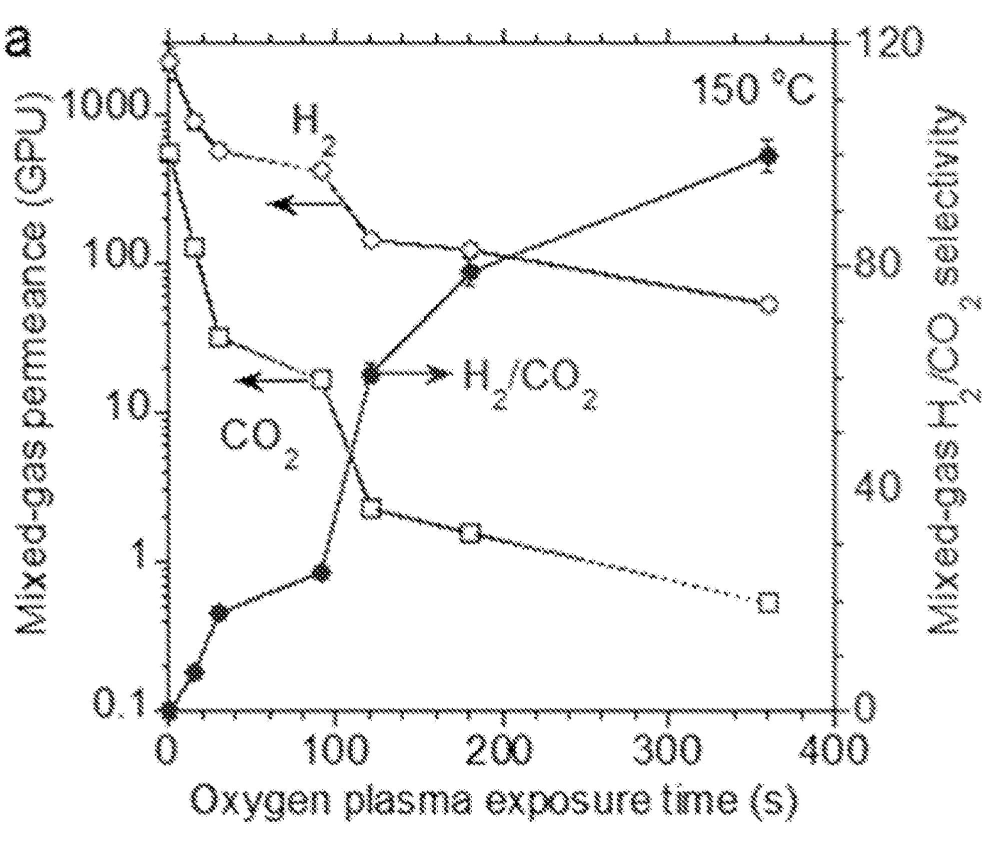
FIG. 3 shows a) effects of oxygen plasma exposure time on the mixed-gas separation performance. b) Pure-gas permeance and gas/$N_2$ selectivity of a POSi120 membrane. c) Effect of test temperature on the mixed-gas permeance and selectivity of a POSi120 membrane. d) Stability test in a POSi120 membrane using $H_2$:$CO_2$ (50:50) with and without water vapor at 200° C. e) Long-term stability of POSi120 over 340 days. Error bars are less than 4% of the values unless specified.
Figure 3:
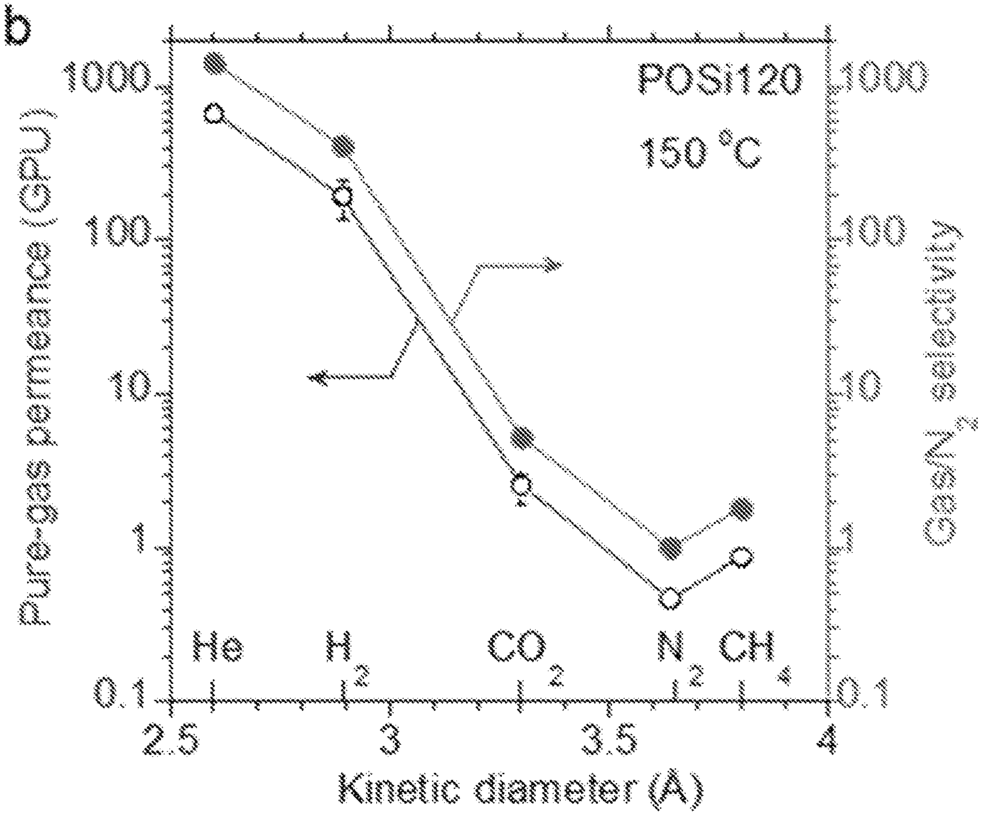
Figure 3:
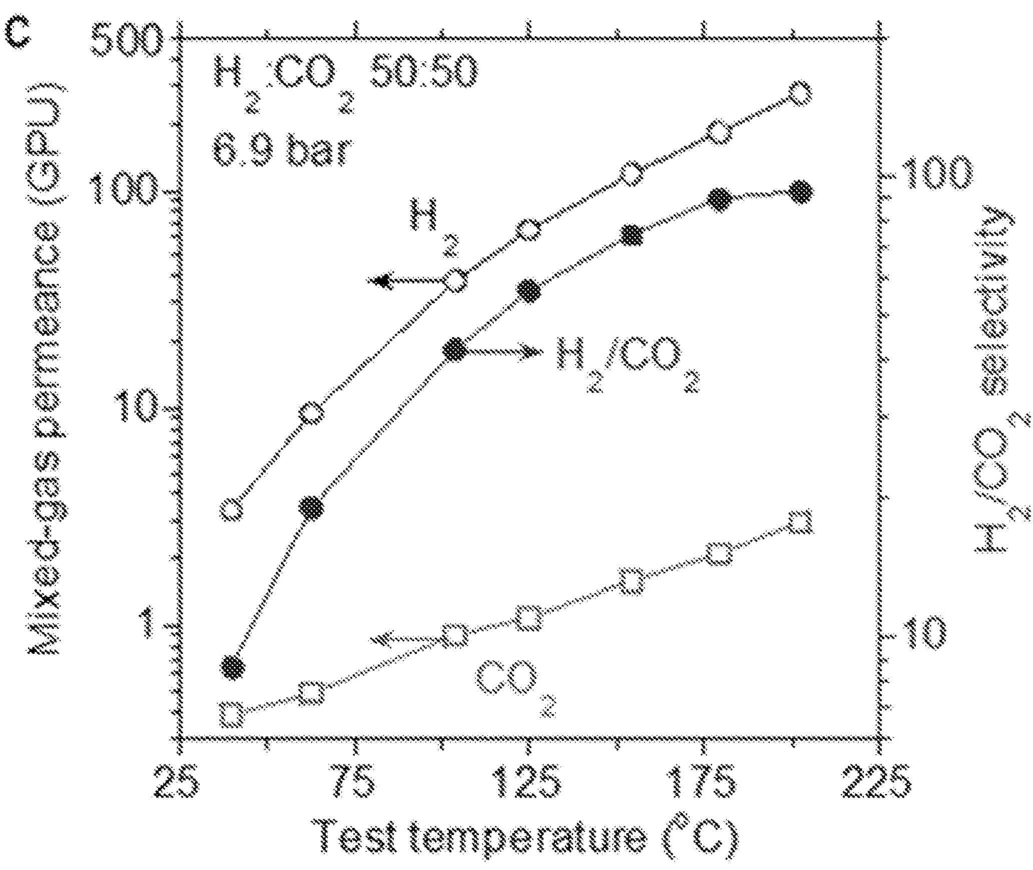
Figure 3:
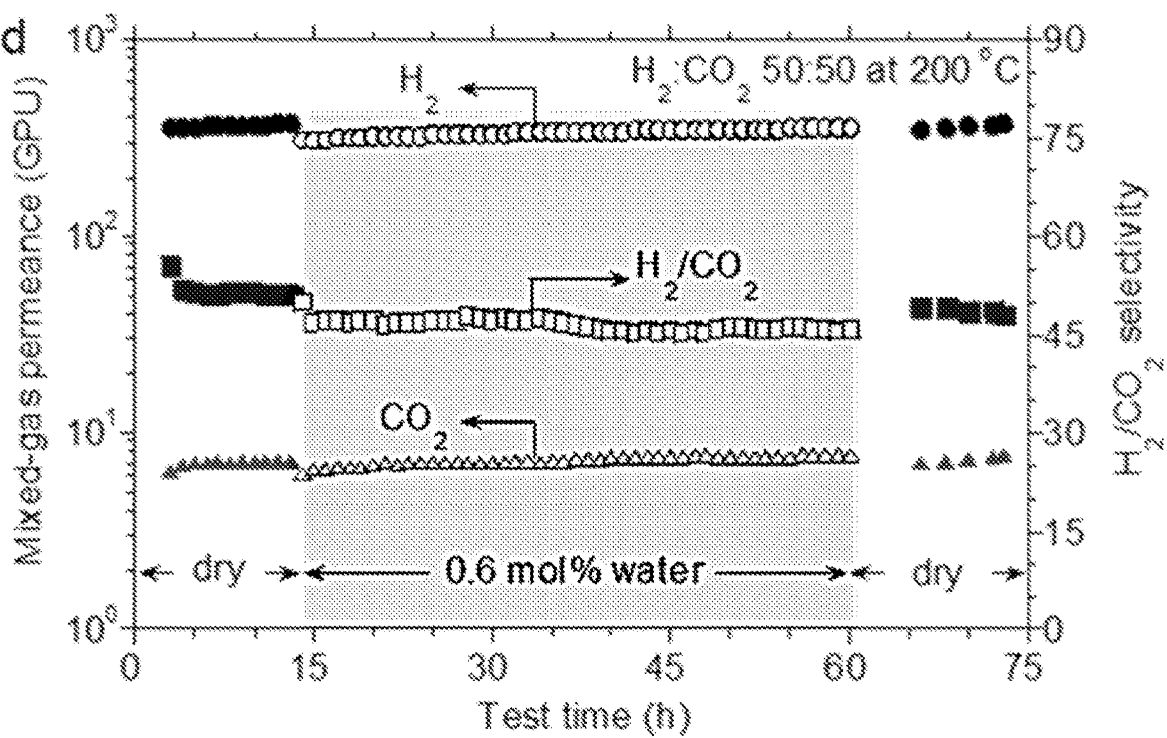
Figure 3:
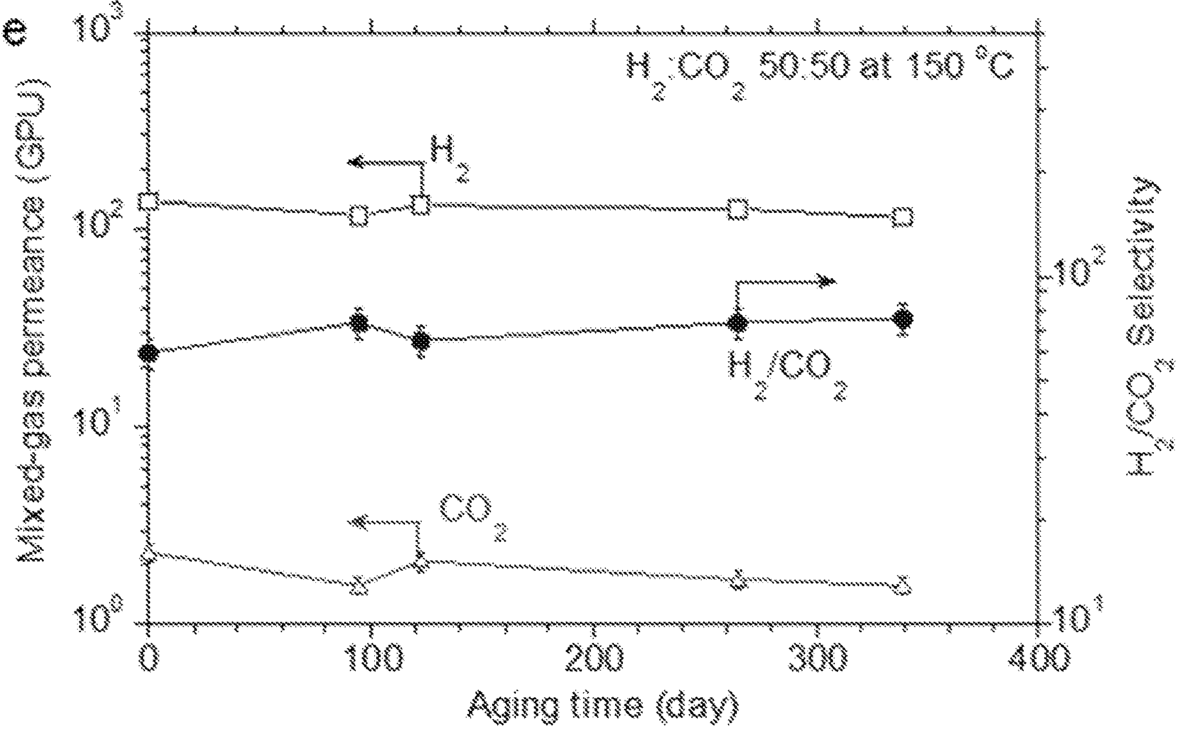

FIG. 3*a* displays the effect of the oxygen plasma exposure time on $H_2/CO_2$ separation properties of the POSi membranes when tested with a binary gas mixture of 50% $H_2$ and 50% $CO_2$ at 150° C. and 6.9 bar. The POSi membranes were prepared from the TFC membranes with 1 μm-thick PDMS. Increasing the plasma exposure time decreases the mixed-gas permeance but significantly enhances $H_2/CO_2$ selectivity. For example, POSi15 shows $H_2/CO_2$ selectivity of 7.2, while POSi360 exhibits a remarkable selectivity of 100, comparable to that (98) of a calcined silica membrane operated at 300° C. By contrast, the pristine PDMS exhibits $H_2/CO_2$ selectivity of only 0.25 at 35° C. (Table 2) and 1.2 at 150° C. Increasing the plasma treatment time from 15 to 360 s decreases the $H_2$ permeance from 930 to 54 GPU. These values are much lower than the $H_2$ permeance of the pristine PDMS membranes (≈5000 GPU at 150° C.), indicating the negligible gas transport resistance in the PDMS layer compared with the organosilica layer.

POSi120 membrane was chosen for further study because of its balanced mixed-gas $H_2$ permeance (144 GPU) and $H_2/CO_2$ selectivity (61) at 150° C. FIG. 3*b* shows pure-gas permeance of various gases at 150° C. to probe pore sizes of the organosilica structure. POSi120 exhibits pure-gas permeance of He (kinetic diameter: 2.6 Å), $H_2$ (2.89 Å), $CO_2$ (3.3 Å), $N_2$ (3.64 Å), and $CH_4$ (3.8 Å) of 660±30 GPU, 190±7 GPU, 2.5±0.1 GPU, 0.47±0.02 GPU, and 0.86±0.04 GPU, respectively. Except for $CH_4$, gas permeance decreases with increasing penetrant size, suggesting that the gas permeation follows a solution-diffusion mechanism. Pure-gas $H_2/CO_2$ selectivity is 76, though their kinetic diameter difference is only 0.41 Å, suggesting that most pores for gas permeation in POSi120 may have a size less than 3.3 Å. POSi120 membrane also shows 1120/$H_2$ selectivity of 2.7 when challenged with a binary mixture, which can be ascribed to the smaller kinetic diameter but higher critical temperature of $H_2O$ than Hz.

Figure 8:
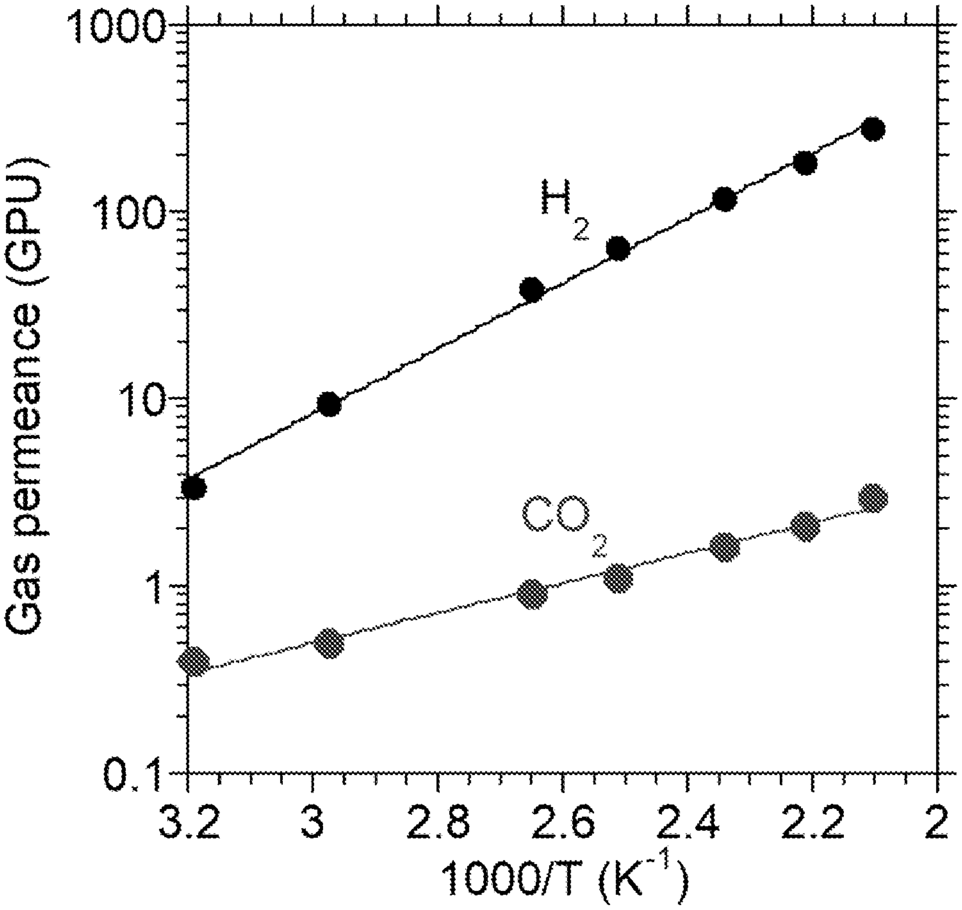
FIG. 8 shows $H_2$ and $CO_2$ permeance of the POSi120 membrane as a function of test temperature. The lines are the best fits to Equation 2.

FIG. 3*c* shows that increasing the temperature drastically increases mixed-gas $H_2$ permeance and $H_2/CO_2$ selectivity. For example, the POSi120 membrane shows $H_2$ permeance of 3.4 GPU and $H_2/CO_2$ selectivity of 8.6 at 40° C., while it displays $H_2$ permeance of 280±5 GPU and $H_2/CO_2$ selectivity of 93±1 at 200° C. The effect of the temperature on gas permeance can be described using the Arrhenius equation with an activation energy of permeation of 33 kJ/mol for $H_2$ and 15 kJ/mol for $CO_2$ (FIG. 8). The lower activation energy of permeation for $CO_2$ can be ascribed to its greater enthalpy of condensation than Hz. This phenomenon agrees with that observed in a silica membrane supported on alumina.

Industrial syngas contains small amounts of other components such as $H_2O$. FIG. 3*d* shows the effect of water vapor on mixed-gas separation properties and stability of a POSi120 membrane at 6.9 bar and 200° C. The membrane was initially tested using a dry gas mixture (50% $H_{2/50}$% $CO_2$) for 13 h. Then, 0.6 mol % water vapor was introduced in the mixed-gas feed, and the mixed-gas permeance was tested for 47 h. Adding water vapor decreases the mixed-gas $H_2$ permeance from 370 to 350 GPU and decreases the $H_2/CO_2$ selectivity from 51 to 46. When the feed gas was switched back to the dry gas, the $H_2$ permeance and $H_2/CO_2$ selectivity recovered to 370 GPU and 49, respectively. This 3-day continuous test confirms that the POSi membranes are stable for $H_2/CO_2$ separation in the presence of the water vapor. FIG. 3*e* also shows the long-term stability of a POSi120 for mixed-gas $H_2/CO_2$ separation properties. The sample was stored in the air and tested periodically for 340 days. The $H_2$ permeance decreases by 14%, while the $H_2/CO_2$ selectivity increases by 27% over this period. Such performance variation for one year is common for industrial membranes, further validating the viability of POSi for practical applications.

Figure 9:
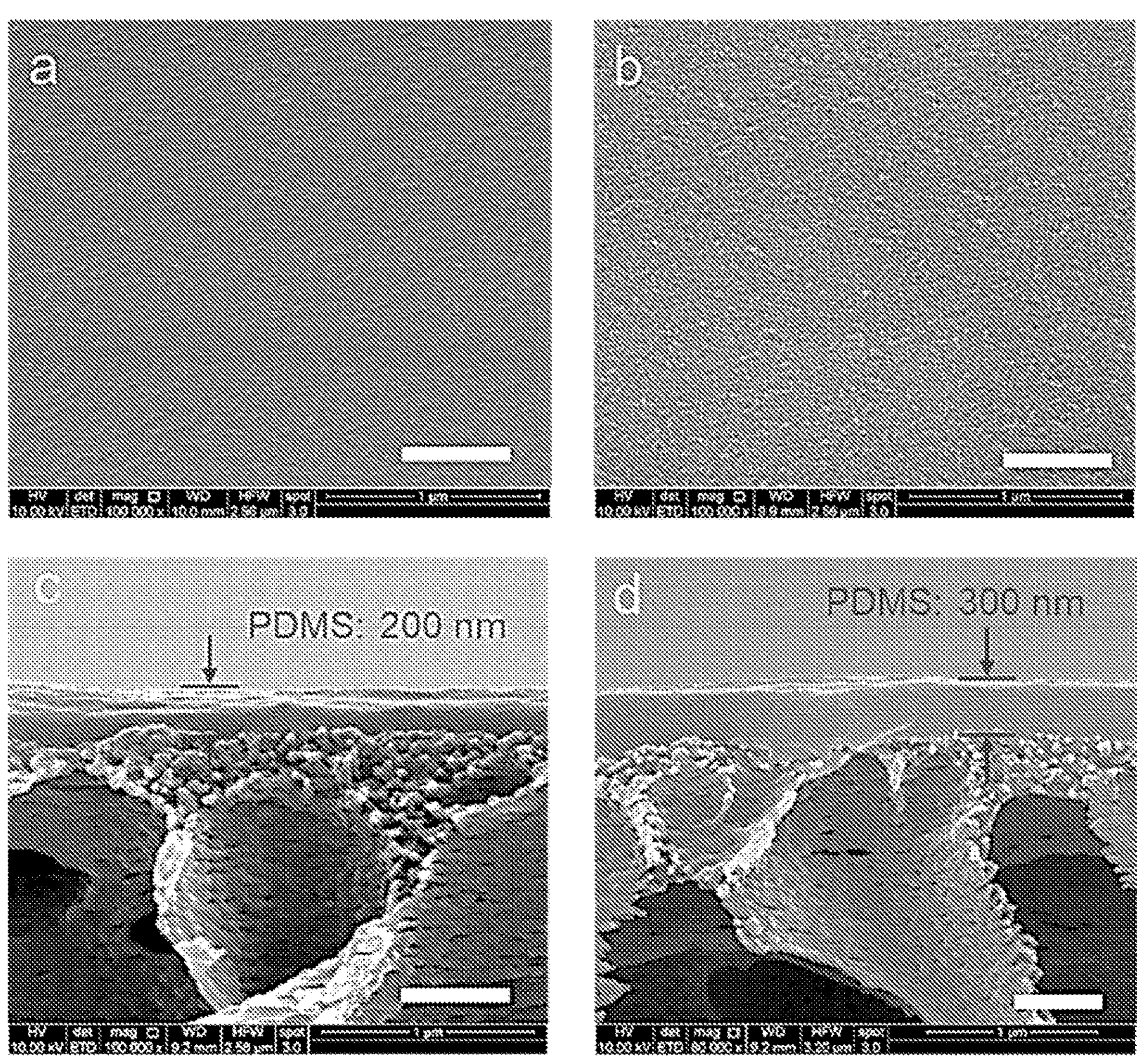
FIG. 9 shows surface SEM images of the PDMS TFC membranes with a PDMS thickness of a) 1 μm and b) 200 nm. Cross-sectional SEM images of the PDMS TFC membranes with a PDMS thickness of c) 200 nm and d) 300 nm.

FIG. 4*a* shows the effect of the PDMS layer thickness on the mixed-gas $H_2/CO_2$ separation performance in POSi120 when tested with a binary mixture of 50:50 $H_2/CO_2$ at 200° C. Decreasing the PDMS layer from 1 μm to 200 nm increases the $H_2$ permeance from 280 to 930 GPU but decreases the $H_2/CO_2$ selectivity from 93 to 32, presumably due to the increasing number of 'defects' (i.e., unoxidized PDMS with high $CO_2$ permeability) in a thinner PDMS layer. The 'defects' may appear when a certain area of PDMS chains is not fully exposed to the oxygen plasma; a smooth and uniform PDMS surface is key to the formation of continuous silica structure. The PBI support has a porous and rough surface (FIG. 6), and its morphology inevitably affects the roughness of any overlaid thin films. Compared to a 200 nm-thick PDMS film, a 1 μm-thick PDMS layer is more successful in reducing the porous support interference to achieve a smooth surface (FIGS. 9*a* and *b*). The cross-sectional SEM images of the membranes with a thinner PDMS layer (200-300 nm) are shown in FIGS. 9*c* and *d*. FIG. 4*a* also compares the $H_2/CO_2$ separation performance of the POSi membranes with the state-of-the-art TFC membranes, including commercial *Proteus*™ membrane,[6] cross-linked polyamide TFC membranes,[34] PBI hollow fiber membranes,[9] and PBI-based MN Ms containing ZIF-8[35] and Pd nanoparticles.[19, 36] All the POSi120 membranes are superior to the polymeric membrane benchmarks in terms of combined high permeance and selectivity and demonstrate their promise for low-cost pre-combustion $CO_2$ capture and $H_2$ production.

FIG. 4*b* compares $H_2/CO_2$ separation performance of the POSi120 membranes with state-of-the-art polymeric materials (including PBI,[37] PBI/$H_3PO_4$,[8] CMS,[20] and M Ms[18, 19, 35, 38] in a Robeson's plot. Polymers with excellent processability have great potential to be fabricated into TFC membranes with an assumed selective layer thickness of 1 μm. The upper bound defines the highest $H_2/CO_2$ selectivity achievable for any $H_2$ permeance in polymers and is often used to benchmark any new materials developed. These polymeric materials show the separation properties on or above the upper bound. By contrast, the organosilica materials of the present disclosure surpass the upper bounds and the start-of-the-art polymeric materials for $H_2/CO_2$ separation.

Syngas may contain light gases such as $N_2$, and thus, the membranes should also have high $H_2/N_2$ separation properties. FIG. 4*c* compares the POSi120 with state-of-the-art polymers for $H_2/N_2$ separation.[39] The POSi120 exhibits separation properties above the upper bound. FIG. 4*c* also suggests that the POSi120 has superior $He/N_2$ separation properties.

FIG. 4*d* compares the POSi120 membranes with state-of-the-art inorganic membranes for $H_2/CO_2$ separation such as silica,[10, 12] zeolites,[1, 13], MOFS,[14, 40] GO,[2, 3] ZIF/GO,[41] $MoS_2$,[16] and g-$C_3N_4$ nanosheets.[17] These inorganic membranes exhibit $H_2/CO_2$ separation properties above the upper bound (which is defined for polymeric membranes). The POSi120 membranes show competitive separation properties.

Conclusion.

Nanoporous silica membranes comprising a thin selective layer (≈6 nm) on conventional polymeric TFC membranes by oxygen-plasma treatment of PDMS membranes at room temperature were prepared. This approach-low-cost surface treatment of a polymeric membrane to create an inorganic selective layer-represents a paradigm shift in approaches to membrane development, bringing together the traditionally disparate spheres of polymeric and inorganic membrane research to combine the strengths of both. Pre combustion carbon capture is a critical approach to produce blue $H_2$ with mitigated carbon emissions. The POSi membranes with superior $H_2/CO_2$ separation properties can be reproducibly prepared from inexpensive polymers without energy-intensive hydrothermal treatment or calcination, impacting the economics of $CO_2$ capture for the production of blue $H_2$ on a large scale with minimal $CO_2$ release into the atmosphere. The POSi membranes with tunable molecular sieving abilities have promise for other gas and vapor separations as well.

Experimental Section

Fabrication of POSi membranes: POSi membranes were fabricated in three steps, including preparation of a PBI porous support, coating a PDMS layer, and oxygen plasma treatment.

First, the PBI porous support was prepared via a phase inversion method. For this, 0.5 g poly(ethylene glycol) (PEG, $M_w$ 400 g/mol) was added to 10 g PBI S15 solution (PBI Performance Products, Inc.) containing 15 wt. % PBI in N,N-dimethylacetamide (DMAc). Second, 2 mL solution was cast on a 10×15 cm stainless steel wire cloth (mesh size: 325×2300, McMaster-Carr, OH) using a casting knife with a gate clearance of 200 μm. Third, the liquid film was immersed into a water bath at 50° C. for 1 h to form the porous support, which then went through a solvent exchange in the order of DI water, methanol, and iso-octane at 25° C. for 30 min each. Finally, the PBI support was obtained by drying at 25° C. in a fume hood for 1 day.

Second, the PDMS coating was prepared via a dip-coating method. The PBI support was first cut into 3×3 cm samples and then masked onto a glass slide using aluminum tape with all edges sealed. The sample was then dipped into a ~2.0 wt. % PDMS coating solution for 5 s. After curing at 100° C. for 30 mins, the composite membrane with a PDMS layer of 1 μm can be obtained. The 2 wt. % PDMS coating solution was prepared by dissolving 900 mg Dehesive® 944 (Wacker Chemical Corporation, Adrian, MI, USA), 100 mg Wacker cross-linker V24, and 60 mg Wacker catalyst OL in 43.9 g toluene. Thinner PDMS layers of 200-300 nm can be prepared using coating solutions of 0.5 wt %-1.0 wt %.

Finally, the POSi membranes were fabricated by oxygen plasma treatment in a plasma etcher (Trion Technology Oracle III, Clearwater, FL, USA). The reactive ion etcher power and inductively coupled plasma source power were set at 20 and 50 Watt, respectively, and the oxygen flow rate was 10 $cm^3$/min at a chamber pressure of 6.7 Pa at 20° C. Plasma exposure time was varied from 15 to 360 s to achieve different degrees of surface modification.

Characterization: Scanning electron microscopy (SEM) was performed using a focused ion beam scanning electron microscope (Carl Zeiss AURIGA CrossBeam, German) and FEI Quanta™ 600F scanning electron microscope (Thermo Fisher Scientific, OR, USA). To reduce the charging effect during SEM imaging, a 2 and 12 nm-thick gold-palladium alloy coating was respectively deposited onto the surface and cross-section specimens in a sputter coater (EMS 150TES, Quorum Technologies, East Sussex, UK). Cross-section specimens were prepared via a liquid nitrogen freeze-fracturing method. X-ray photoelectron spectroscopy (XPS) analysis and depth profiling were performed using a PHI 5600ci photoelectron spectrometer (Physical Electronics Inc., Chanhassen, MN, USA). Argon sputtering was used to mill the specimen at an etching rate of 14 nm/min, which had been calibrated using a PDMS sample of known thickness. Atomic force microscopy (AFM) was performed using a Cypher atomic force microscope (Asylum Research, Santa Barbara, CA, USA) in Fast Force Mapping mode with an indentation force of 30 nN. The cantilever used (All in One-A1, Budget Sensors, Bulgaria) had a stiffness of 2.36 N/m and a tip radius of 10 nm. The PDMS and POSi samples for XPS and AFM analysis were prepared on Si wafers in the same procedure of fabricating POSi membranes.

Gas permeation measurement: Pure- and mixed-gas permeance was determined using a constant-pressure and variable-volume apparatus at 40-200° C. The membrane was masked using a copper disc (hole diameter: 1-2.5 cm) with its rim sealed with Devcon® epoxy (IWT, Hartford, CT, USA). The sample was then loaded into a stainless-steel permeation cell providing countercurrent flows for both feed and sweep gas. The feed gas (112, $CO_2$, or $H_2/CO_2$ mixture) at 6.9 bar had a flow rate of 200 $cm^3$ (STP) $min^{-1}$ to achieve a stage-cut less than 1%. Water vapor could be introduced to the feed gas using a bubbler at 25° C. The humidifier provided 0.041 bar water vapor (or 0.6 mol %) to the gas stream at 6.9 bar. $N_2$ was used as a sweep gas on the permeate side with a flow rate (S) of 2-10 $cm^3$ (STP) $min^{-1}$ and 1 atm. The composition of the permeate and retentate stream was periodically analyzed using a 3000 Micro GC gas analyzer (Inficon Inc., Syracuse, NY, USA). Gas permeance (PA/1) of gas component A can be calculated using the following equation:

$$P_A/l = \frac{x_A S}{x_{sweep} A(p_{2,A} - p_{1,A})} \quad (1)$$

where A ($cm^2$) is the active area of the membrane for gas permeation, $p_{2,A}$ and $p_{1,A}$ are the partial pressure of gas component A in the feed and permeate side, respectively, and $x_A$ and $x_{sweep}$ are the mole fraction of gas component A and sweep gas in the sweep-out stream, respectively.

REFERENCES

[1] M. Dakhchoune, L. F. Villalobos, R. Semino, L. M. Liu, M. Rezaei, P. Schouwink, C. E. Avalos, P. Baade, V. Wood, Y. Han, M. Ceriotti, K. V. Agrawal, *Nat. Mater.* 2020, in press.

[2] H. Kim, H. Yoon, S. Yoon, B. Yoo, B. Ahn, Y. Cho, H. Shin, H. Yang, U. Paik, S. Kwon, J. Choi, H. Park, *Science* 2013, 342, 91.

[3] H. Li, Z. Song, X. Zhang, Y. Huang, S. Li, Y. Mao, H. J. Ploehn, Y. Bao, M. Yu, *Science* 2013, 342, 95.

[4] H. Lin, E. Van Wagner, B. D. Freeman, L. G. Toy, R. P. Gupta, *Science* 2006, 311, 639.

[5] D. C. Miller, J. T. Litynski, L. A. Brickett, B. D. Morreale, *AIChE J.* 2016, 62, 2.

[6] T. C. Merkel, M. Zhou, R. W. Baker, *J. Membr. Sci.* 2012, 389, 441.

[7] H. Park, J. Kamcev, L. M. Robeson, M. Elimelech, B. D. Freeman, *Science* 2017, 356, eaab0530.

[8] L. Zhu, M. T. Swihart, H. Lin, *Energy Environ. Sci.* 2018, 11, 94.

[9] L. Hu, S. Pal, H. Nguyen, V. Bui, H. Lin, *J. Polym. Sci.* 2020, 58, 2467.

[10] R. M. de Vos, H. Verweij, *Science* 1998, 279, 1710.

[11] C. Yacou, S. Smart, J. C. D. da Costa, *Energy Environ. Sci.* 2012, 5, 5820. [12] H. Song, Y. Wei, H. Qi, *J. Mater. Chem. A* 2017, 5, 24657.

[13] M. Yu, H. H. Funke, R. D. Noble, J. L. Falconer, *J. Am. Chem. Soc.* 2011, 133, 1748.

[14] Y. Peng, Y. Li, Y. Ban, H. Jin, W. Jiao, X. Liu, W. Yang, *Science* 2014, 346, 1356.

[15] M. Shan, X. Liu, X. Wang, I. Yarulina, B. Seoane, F. Kapteijn, J. Gascon, *Sci. Adv.* 2018, 4, eaau 1698.

[16] A. Achari, S. Sahana, M. Eswaramoorthy, *Energy Environ. Sci.* 2016, 9, 1224.

[17] L. F. Villalobos, M. T. Vandat, M. Khchoune, Z. Nadizadeh, M. Mensi, E. Oveisi, D. Campi, N. Marzari, K. V. Agrawal, *Sci. Adv.* 2020, 6, eaay9851.

[18] S. Japip, K. Liao, T. Chung, *Adv. Mater.* 2016, 29, 1603833; T. Yang, Y. Xiao, T. Chung, *Energy Environ. Sci.* 2011, 4, 4171.

[19] L. Zhu, D. Yin, Y. Qin, S. Konda, S. Zhang, A. Zhu, S. Liu, T. Xu, M. T. Swihart, H. Lin, *Adv. Funct. Mater.* 2019, 29, 1904357.

[20] M. Omidvar, H. Nguyen, L. Huang, C. M. Doherty, A. J. Hill, C. M. Stafford, X. Feng, M. T. Swihart, H. Lin, *ACS App. Mater. Interfaces* 2019, 11, 47365.

[21] J. Adams, N. Bighane, W. J. Koros, *J. Membr. Sci.* 2017, 524, 585.

[22] B. Nguyen, S. Dabir, T. Tsotsis, M. Gupta, *Ind. Eng. Chem. Res.* 2019, 58, 15190.

[23] R. M. de Vos, H. Verweij, *J. Membr. Sci.* 1998, 143, 37.

[24] M. Nomura, T. Yamaguchi, S. Nakao, *Ind. Eng. Chem. Res.* 1997, 36, 4217.

[25] S. Bhattacharya, A. Datta, J. M. Berg, S. Gangopadhyay, *J. Microelectromech. S.* 2005, 14, 590.

[26] G. S. Ferguson, M. K. Chaudhury, G. B. Sigal, G. M. Whitesides, *Science* 1991, 253, 776.

[27] M. J. Owen, P. J. Smith, *J. Adhes. Sci. Techn.* 1994, 8, 1063.

[28] H. Hillborg, J. F. Ankner, U. W. Gedde, G. D. Smith, H. K. Yasuda, K. Wikström, *Polymer* 2000, 41, 6851.

[29] S. Béfahy, P. Lipnik, T. Pardoen, C. Nascimento, B. Patris, P. Bertrand, S. Yunus, *Langmuir* 2010, 26, 3372.

[30] H. Matsuyama, M. Teramoto, K. Hirai, *J. Membr. Sci.* 1995, 99, 139.

[31] P. W. Kramer, Y. S. Yeh, H. Yasuda, *J. Membr. Sci.* 1989, 46, 1.

[32] Z. Wang, A. A. Volinsky, N. D. Gallant, *J. Appl. Polym. Sci.* 2014, 131, 41050.

[33] T. C. Merkel, R. P. Gupta, B. S. Turk, B. D. Freeman, *J. Membr. Sci.* 2001, 191, 85.

[34] Z. Ali, F. Pacheco, E. Litwiller, Y. Wang, Y. Han, I. Pinnau, *J. Mater. Chem. A* 2018, 6, 30.

[35] T. Yang, G. Shi, T. Chung, *Adv. Energy Mater.* 2012, 2, 1358.

[36] L. F. Villalobos, R. Hilke, F. H. Akhtar, K. V. Peinemann, *Adv. Energy Mater.* 2017, 8, 1701567.

[37] L. Zhu, M. T. Swihart, H. Lin, *J. Mater. Chem. A* 2017, 5, 19914.

[38] T. X. Yang, T. S. Chung, *J. Mater. Chem. A* 2013, 1, 6081.

[39] L. M. Robeson, *J. Membr. Sci.* 2008, 320, 390.

[40] Y. Peng, Y. Li, Y. Ban, W. Yang, *Angew. Chem.* 2017, 56, 9757.

[41] A. Huang, Q. Liu, N. Wang, Y. Zhu, J. Caro, *J. Am. Chem. Soc.* 2014, 136, 14686.

Example 2

Materials.

Celazole® PBI S15 solution with 15 wt. % PBI dissolved in N,N-dimethylacetamide (DMAc) was provided by PBI Performance Products, Inc. (Charlotte, SC). Anhydrous DMAc (>99.5%), toluene (>99.9%), and poly(ethylene glycol) (PEG, $M_w$ 400 g/mol) were purchased from Thermo Fisher Scientific Company (Waltham, MA). Iso-octane (>99%) was supplied by Sigma-Aldrich Chemical Company (St. Louis, MO). Methanol (99%) was provided by VWR International Company (Radnor, PA). DEHESIVE® 944 cross-linkable polydimethylsiloxane (PDMS), WACKER® catalyst OL, and WACKER® crosslinker V24 were supplied by Wacker Chemical Corporation, Adrian, MI. Gas cylinders of $H_2$, He, Ar, $N_2$, and $CO_2$ with ultrahigh purity (99.999%) were obtained from Airgas USA, LLC (Buffalo, NY). All chemicals were used as received without further purification.

Additional Results and Discussion.

Figure 6:
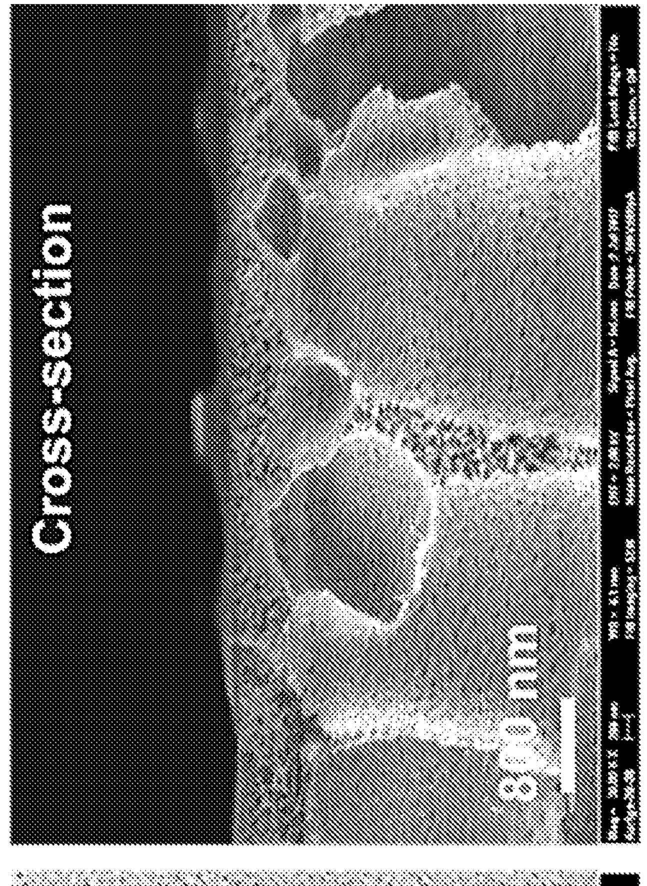
FIG. 6 shows surface and cross-section SEM images of a porous PBI support.
Figure 6:
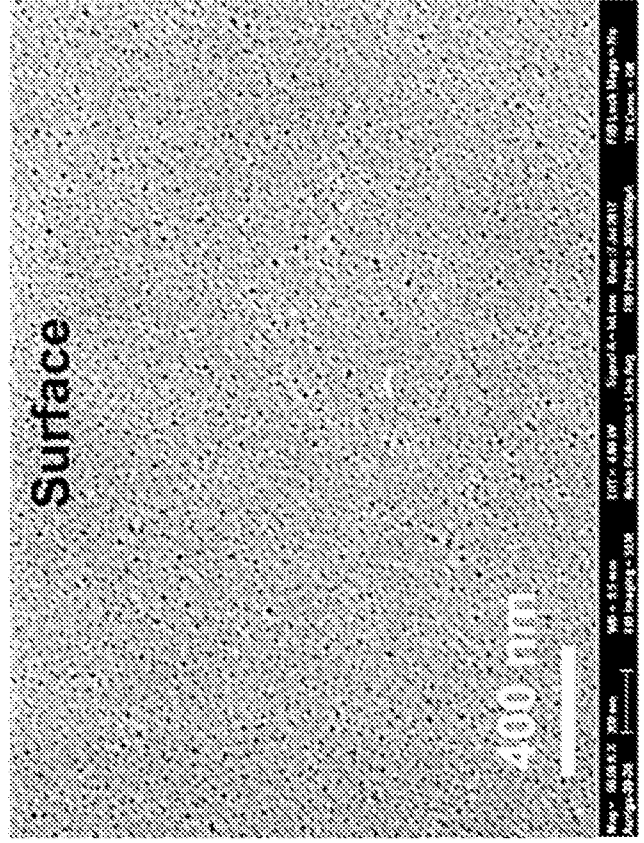

FIG. 6 shows surface and cross-sectional micrographs of a PBI porous support film. The support has surface pores less than 20 nm in diameter. As shown in the cross-section image, this support has a finger structure and a thin microporous skin layer, providing very high gas permeance. At 23° C., it exhibits $H_2$ and $CO_2$ permeance of ~400,000 GPU and ~100,000 GPU, respectively.

Figure 7:
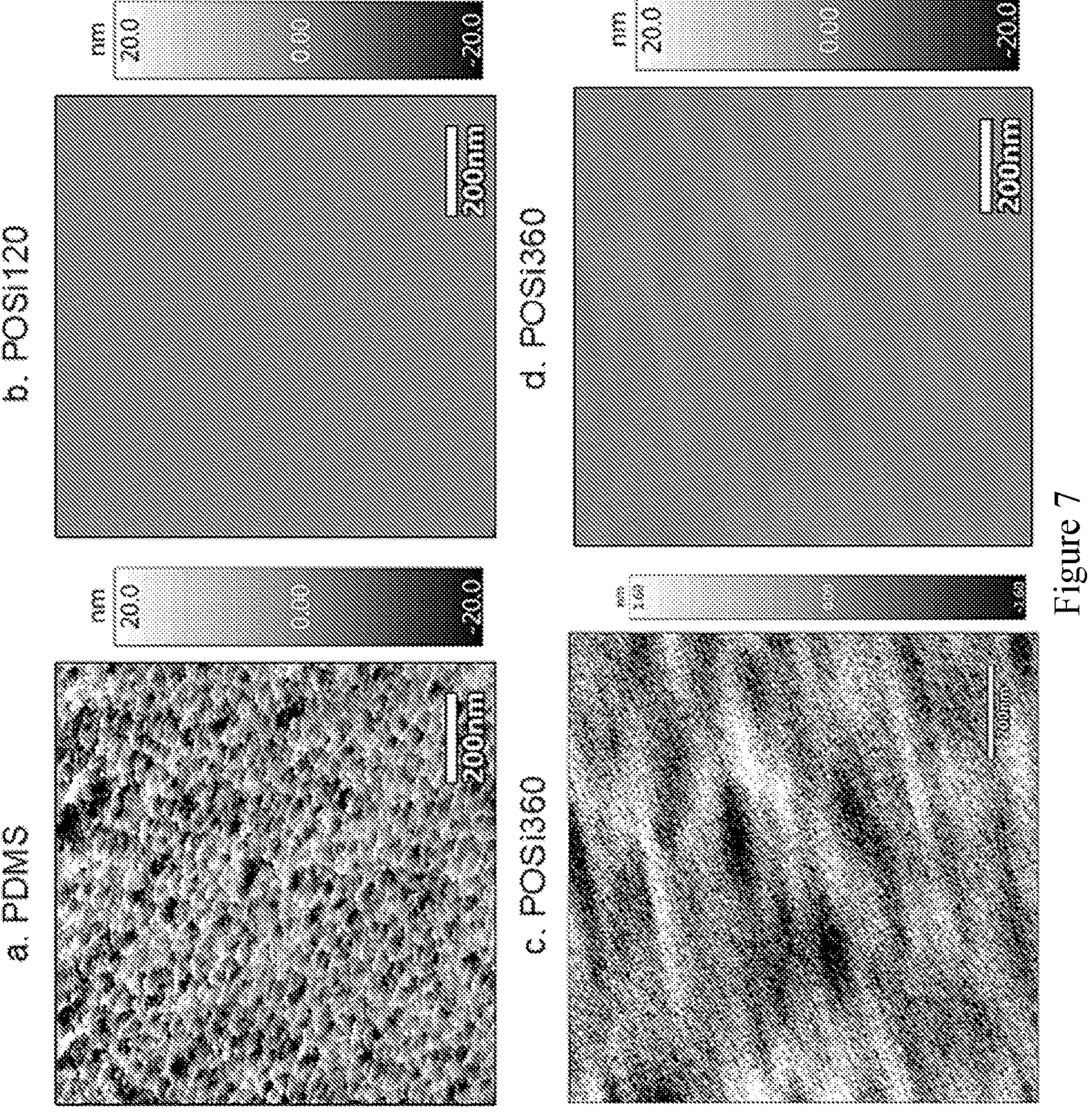
FIG. 7 shows AFM images showing the surface roughness of a) PDMS, b) POSi120, and c) and d) POSi360 with the same height scale in a), b), and d), and a much smaller range of height in c).

FIG. 7 displays the surface roughness of the PDMS and POSi samples on the Si wafers. The AFM cantilever generates 20 nm-deep indentation traces on the soft PDMS because of high adhesion forces (cf. FIG. 7*a*). Due to the formation of a silica surface layer with improved mechanical properties, POSi120 and POSi360 are free from indentation traces and show a smoother surface than PDMS.

The temperature dependence of gas permeance is typically modeled by an Arrhenius equation:

$$P/l = (P/l)_0 \exp\left(\frac{-E_P}{RT}\right) \tag{2}$$

where P/l is the gas permeance (GPU), $(P/l)_0$ is the pre-exponential factor (GPU), $E_p$ is the activation energy of gas permeation (kJ/mol), R is the gas constant, and Tis the absolute temperature (K). As shown in FIG. 8, the $H_2$ and $CO_2$ permeance in POSi120 follows this model reasonably well. The $E_P$ values are 33.4 kJ/mol and 15.4 kJ/mol for $H_2$ and $CO_2$, respectively.

TABLE 1

Deconvoluted Si 2p and C 1s XPS peaks for the pristine PDMS and POSi samples on silicon wafers.

| | Si 2p | | | C 1s | |
|---|---|---|---|---|---|
| Samples | Si(—O)$_2$ (%) 102.1 eV | Si(—O)$_3$ (%) 102.8 eV | Si(—O)$_4$ or $SiO_2$ (%) 103.4 eV | C—H (%) 284.6 eV | C—O (%) 286.0 eV |
| PDMS | 100 | | | 100 | |
| POSi15 | 32.3 | 31.9 | 35.8 | 83.4 | 16.6 |
| POSi120 | 12.5 | 25.3 | 62.2 | 79.8 | 20.2 |
| POSi360 | 9.7 | 14.9 | 75.4 | 77.1 | 22.9 |

TABLE 2

Gas permeance and selectivity of 1 μm-thick PDMS membrane samples at 35° C. before the oxygen-plasma treatment.

| | Gas permeance (GPU) | | $CO_2/H_2$ | $H_2/CO_2$ |
|---|---|---|---|---|
| Sample # | $CO_2$ | $H_2$ | selectivity | selectivity |
| 1 | 2269 | 576 | 3.9 | 0.26 |
| 2 | 2440 | 590 | 4.1 | 0.24 |
| 3 | 2290 | 556 | 4.1 | 0.24 |
| Average | 2300 ± 100 | 570 ± 20 | 4.0 | 0.25 |

Table 3 presents literature data on the $H_2/CO_2$ separation performance of state-of-the-art membrane materials, including polymers, mixed matrix materials, and inorganic materials. These data have also been presented in FIG. 4.

TABLE 3

Figure 4:
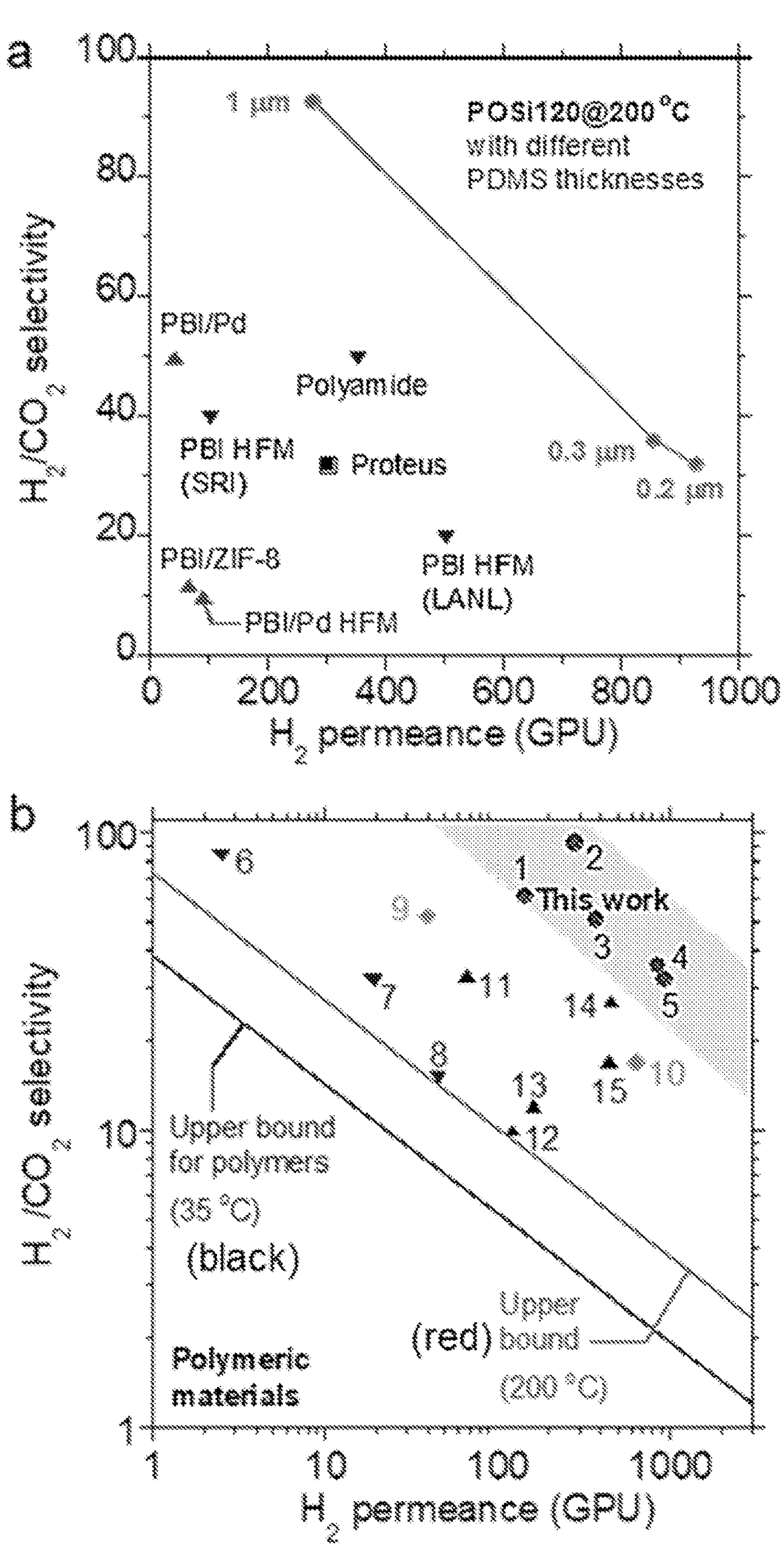
FIG. 4 shows a) comparison of mixed-gas $H_2/CO_2$ separation performance of the POSi120 membranes with state-of-the-art membranes, including *Proteus*™ at 150° C., polyamides at 140° C., PBI hollow fiber membranes (HFMs) at 200-250° C., and MMMs of PBI/Pd at 175° C. and 60° C., and PBI/ZIF-8 at 180° C. b) Comparison with polymeric materials, including PBI, PBI doped with $H_3PO_4$, CMS, and MMMs in the Robeson's upper bound plot. These materials are assumed to be fabricated into 1-μm thick TFC membranes. The black line is the 2008 upper bound at 35° C., and the line is the upper bound predicted for 200° C. c) Superior $H_2/N_2$ and $He/N_2$ separation performance versus Robeson's 2008 upper bounds. d) Comparison with inorganic membranes, including silica, zeolites, MOFs, GO, ZIF/GO, $MoS_2$, and g-$C_3N_4$ nanosheets. The detailed membrane separation performance is also summarized in Table 3.
Figure 4:
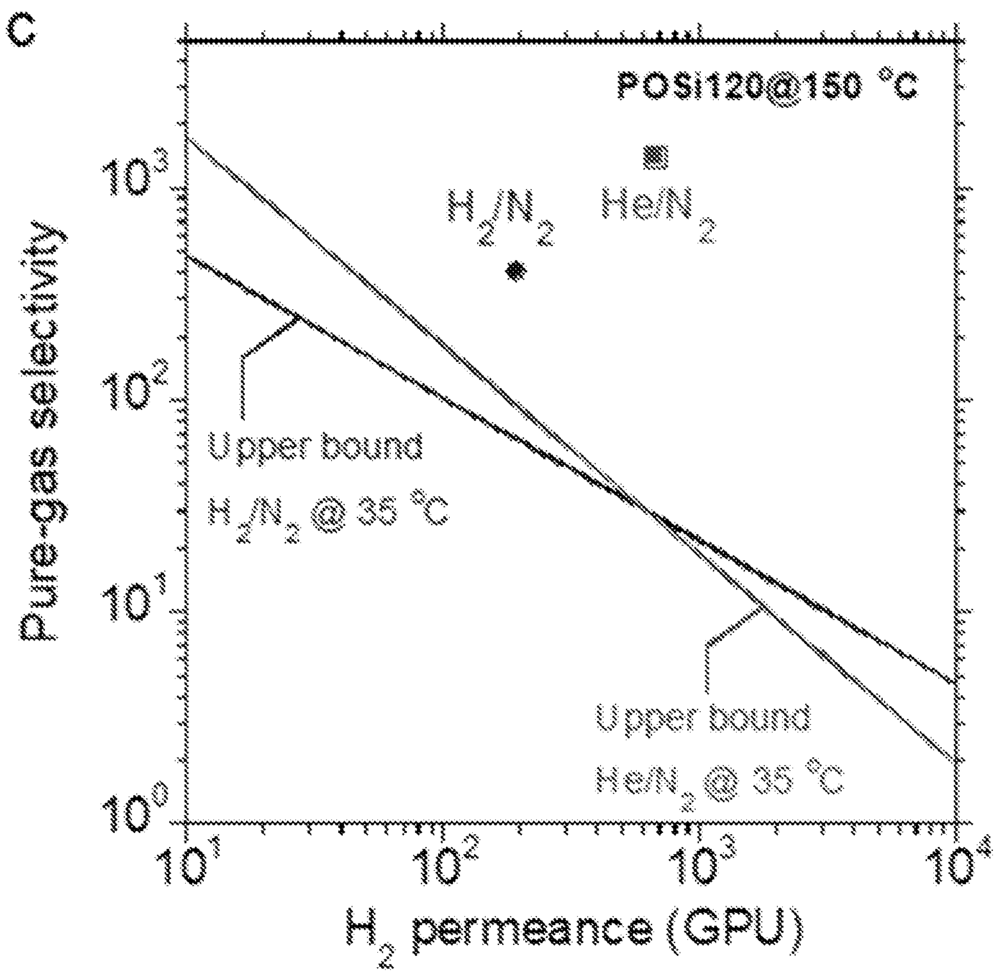
Figure 4:
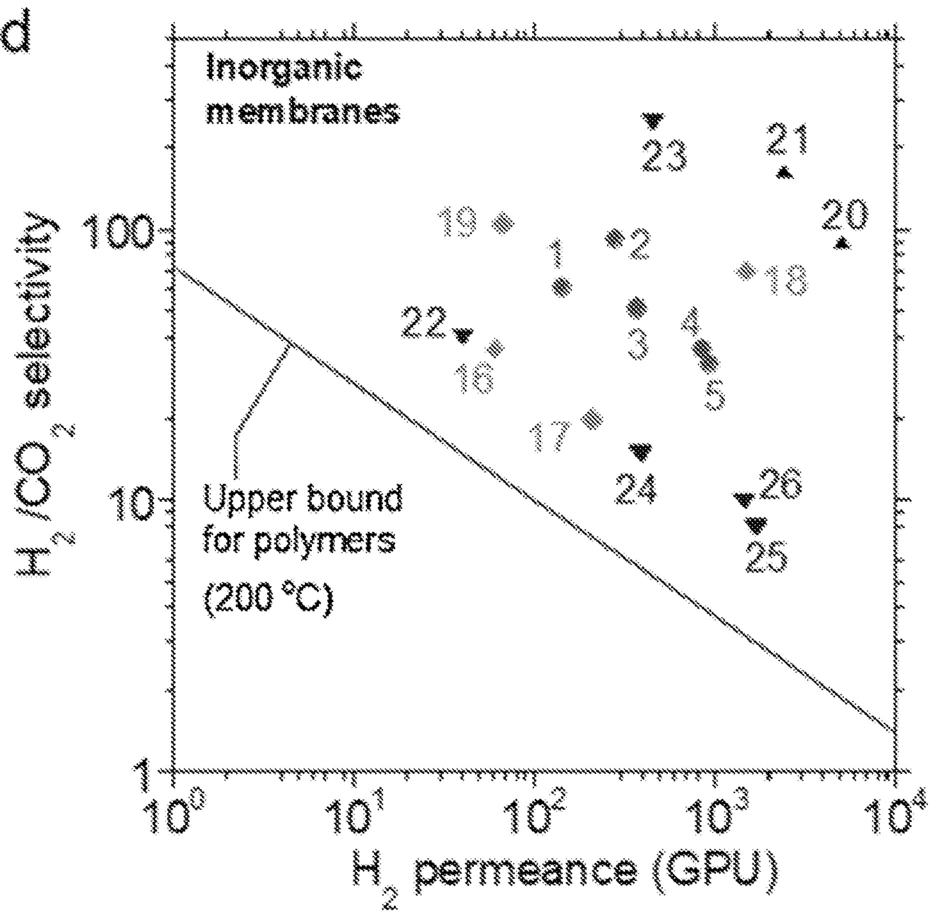
Figure 5:
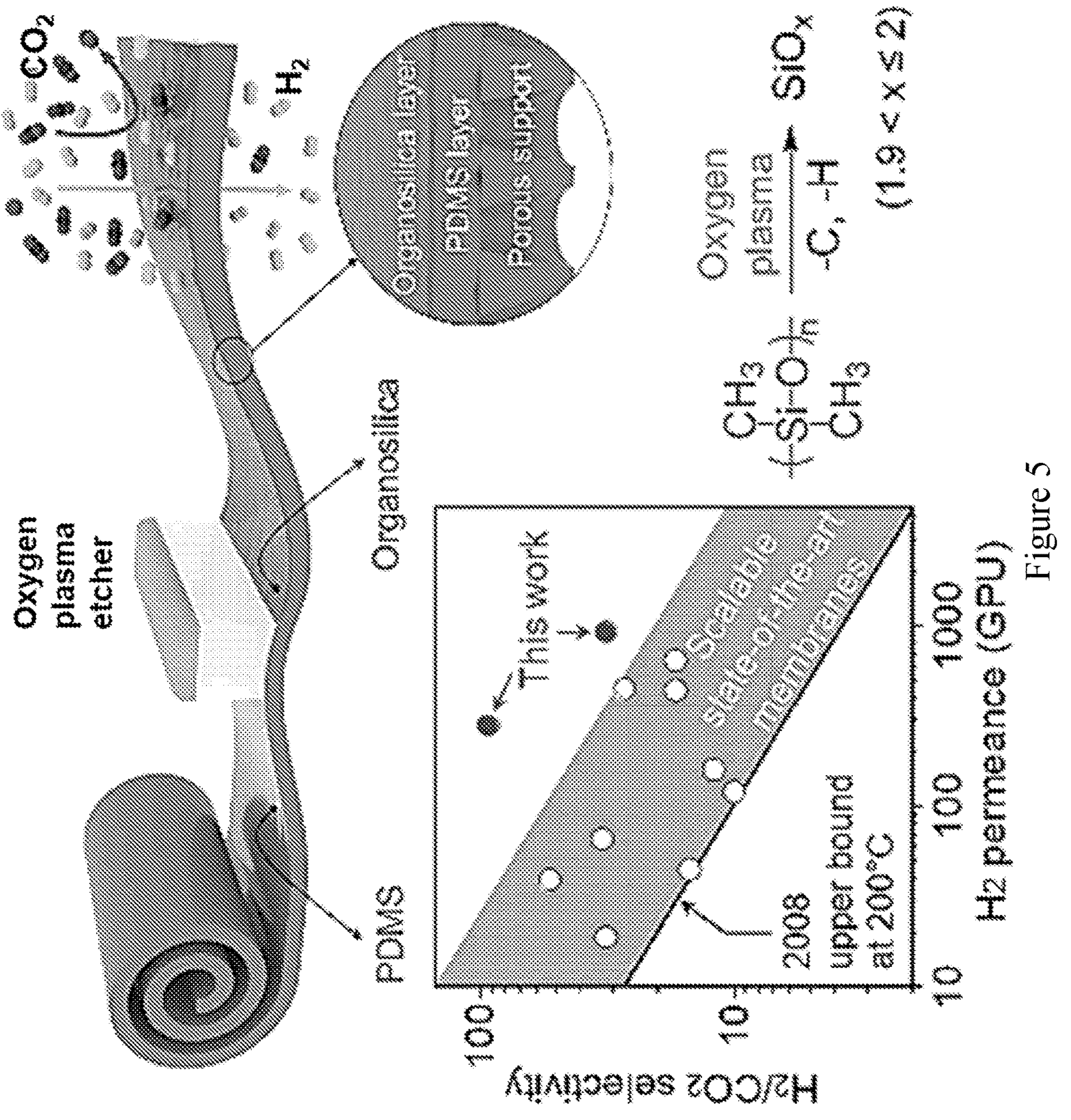
FIG. 5 shows the fabrication process of the POSi membranes, the conversion of polysiloxanes to silica by plasma treatment, and the superior gas separation properties of the membranes for $H_2/CO_2$ separation. The SEM photos of the surface and cross-section of the membranes are also shown.

$H_2/CO_2$ separation properties in selected membrane materials for comparison (see FIG. 4).

| Membranes | | Mixed or pure-gas | T (° C.) | $H_2$ permeance (GPU) | $H_2/CO_2$ selectivity | Example 2 Ref. # | Example 1 Ref. # |
|---|---|---|---|---|---|---|---|
| 1. POSi120 (1 μm PDMS) | | Mixed | 150 | 144 | 61 | This study | |
| 2. POSi120 (1 μm PDMS) | | Mixed | 200 | 280 | 93 | | |
| 3. POSi120 (≤1 μm PDMS) | | Mixed | 200 | 370 | 51 | | |
| 4. POSi120 (300 nm PDMS) | | Mixed | 200 | 860 | 36 | | |
| 5. POSi120 (200 nm PDMS) | | Mixed | 200 | 930 | 32 | | |
| State-of-the-art membranes (FIG. 4a) | Proteus ™ | Mixed | 150 | 300 | 32 | [1] | 6 |
| | Polyamides | Mixed | 140 | 350 | 50 | [2] | 35 |
| | SRI PBI HFM | Mixed | 200 | 100 | 40 | [3] | 9 |
| | LANL PBI HFM | Mixed | 250 | 500 | 20 | [3] | 9 |
| | PBI/Pd | Mixed | 175 | 39 | 43 | [4] | 20 |
| | PBI/Pd HFM | Mixed | 60 | 80 | 10 | [5] | 37 |
| | PBI/ZIF-8 | Pure | 180 | 64.5 | 12 | [6] | 36 |
| Polymeric materials if fabricated into 1 μm thick membranes (FIG. 4b) | 6. PBI/$H_3PO_4$ | Mixed | 200 | 2.5 | 84 | [7] | 8 |
| | 7. PBI/$H_3PO_4$ | Mixed | 200 | 19 | 32 | [7] | 8 |
| | 8. PBI | Mixed | 200 | 45.0 | 15 | [8] | 38 |
| | 9. PBI CMS_900 | Mixed | 150 | 39 | 53 | [9] | 21 |
| | 10. PBI CMS_800 | Pure | 100 | 640 | 17 | [9] | 21 |
| | CMT | Mixed | 150 | 40680 | 6 | [10] | |
| | 11. PBI/Pd NPs (12%) | Mixed | 200 | 66 | 33 | [4] | 20 |
| | 12. PI/ZIF-71 (10%) | Mixed | 150 | 120 | 10 | [11] | 18 |
| | 13. PBI/ZIF-90 (45%) | Pure | 150 | 160 | 12 | [12] | 39 |
| | 14. PBI/ZIF-7 (50) | Pure | 180 | 440 | 17 | [13] | 19 |
| | 15. PBI/ZIF-8 (30) | Pure | 230 | 450 | 27 | [6] | 36 |
| Inorganic membranes (FIG. 4d) | 16. Si600 | Mixed | 200 | 1493 | 71 | [14] | 10 |
| | 17. Si | Mixed | | 60 | 36.4 | [15] | 12 |
| | 18. zeolite composite | Mixed | 200 | 209 | 20 | [16] | 13 |
| | 19. RUB-15 | Mixed | 200 | 67 | 106 | [17] | 1 |
| | RUB-15 | Mixed | 300 | 334 | 32 | [17] | 1 |
| | 20. 2D MOF: $Zn_2(Bim)_4$ | Mixed | 200 | 5000 | 90 | [18] | 14 |
| | 21. 2D MOF: $Zn_2(Bim)_3$ | Mixed | 120 | 2400 | 166 | [19] | 41 |
| | 22. GO | Mixed | 135 | 40 | 40 | [20] | 2 |
| | 23. GO | Mixed | 100 | 450 | 250 | [21] | 3 |

TABLE 3-continued $H_2/CO_2$ separation properties in selected membrane materials for comparison (see FIG. 4).

| Membranes | Mixed or pure-gas | T (° C.) | $H_2$ permeance (GPU) | $H_2/CO_2$ selectivity | Example 2 Ref. # | Example 1 Ref. # |
|---|---|---|---|---|---|---|
| 24. ZIF/GO | Mixed | 250 | 388 | 14.9 | [22] | 42 |
| 25. $MoS_2$ | Pure | 160 | 1700 | 8 | [23] | 16 |
| 26. g-$C_3N_4$ | Mixed | 250 | 1450 | 10 | [24] | 17 |

TABLE 4

$H_2/C_2H_6$ mixed gas data. PDMS 120 S O2 Mixed Gas. The feed gas is $H_2/C_2H_6$ (50/50) mixed gas at 100 psig.

| Temp (° C.) | $H_2$ permeance (GPU) | $C_2H_6$ permeance (GPU) | $H_2/C_2H_6$ Selectivity |
|---|---|---|---|
| 150 | 100.6 | 2.2 | 45.8 |
| 200 | 262.7 | 2.4 | 108.2 |
| 225 | 364.1 | 3.1 | 116.3 |

REFERENCES

[1] T. C. Merkel, M. Zhou, R. W. Baker, *J. Membr. Sci.* 2012, 389, 441.
[2] Z. Ali, F. Pacheco, E. Litwiller, Y. Wang, Y. Han, I. Pinnau, *J. Mater. Chem. A* 2018, 6, 30.
[3] L. Hu, S. Pal, H. Nguyen, V. Bui, H. Lin, *J. Polym. Sci.* 2020, 58, 2467.
[4] L. Zhu, D. Yin, Y. Qin, S. Konda, S. Zhang, A. Zhu, S. Liu, T. Xu, M. T. Swihart, H. Lin, *Adv. Funct. Mater.* 2019, 29, 1904357.
[5] L. F. Villalobos, R. Hilke, F. H. Akhtar, K. V. Peinemann, *Adv. Energy Mater.* 2017, 8, 1701567.
[6] T. Yang, G. Shi, T. Chung, *Adv. Energy Mater.* 2012, 2, 1358.
[7] L. Zhu, M. T. Swihart, H. Lin, *Energy Environ. Sci.* 2018, 11, 94.
[8] L. Zhu, M. T. Swihart, H. Lin, *J. Mater. Chem. A* 2017, 5, 19914.
[9] M. Omidvar, H. Nguyen, L. Huang, C. M. Doherty, A. J. Hill, C. M. Stafford, X. Feng, M. T. Swihart, H. Lin, *ACS App. Mater. Interfaces* 2019, 11, 47365.
[10] W. Liu, S. Jiang, Y. Yan, W. Wang, J. Li, K. Leng, S. Japip, J. T. Liu, H. Xu, Y. P. Liu, I. H. Park, Y. Bao, W. Yu, M. D. Guiver, S. Zhang, K. P. Loh, *Nat. Comm.* 2020, 11, 1633.
[11] S. Japip, K. Liao, T. Chung, *Adv. Mater.* 2016, 29, 1603833.
[12] T. X. Yang, T. S. Chung, *J. Mater. Chem. A* 2013, 1, 6081.
[13] T. Yang, Y. Xiao, T. Chung, *Energy Environ. Sci.* 2011, 4, 4171.
[14] R. M. de Vos, H. Verweij, *Science* 1998, 279, 1710.
[15] H. Song, Y. Wei, H. Qi, *J. Mater. Chem. A* 2017, 5, 24657.
[16] M. Yu, H. H. Funke, R. D. Noble, J. L. Falconer, *J. Am. Chem. Soc.* 2011, 133, 1748.
[17] M. Dakhchoune, L. F. Villalobos, R. Semino, L. M. Liu, M. Rezaei, P. Schouwink, C. E. Avalos, P. Baade, V. Wood, Y. Han, M. Ceriotti, K. V. Agrawal, *Nat. Mater.* 2020, in press.
[18] Y. Peng, Y. Li, Y. Ban, H. Jin, W. Jiao, X. Liu, W. Yang, *Science* 2014, 346, 1356.
[19] Y. Peng, Y. Li, Y. Ban, W. Yang, *Angew. Chem.* 2017, 56, 9757.
[20] H. Kim, H. Yoon, S. Yoon, B. Yoo, B. Ahn, Y. Cho, H. Shin, H. Yang, U. Paik, S. Kwon, J. Choi, H. Park, *Science* 2013, 342, 91.
[21] H. Li, Z. Song, X. Zhang, Y. Huang, S. Li, Y. Mao, H. J. Ploehn, Y. Bao, M. Yu, *Science* 2013, 342, 95.
[22] A. Huang, Q. Liu, N. Wang, Y. Zhu, J. Caro, *J. Am. Chem. Soc.* 2014, 136, 14686.
[23] A. Achari, S. Sahana, M. Eswaramoorthy, *Energy Environ. Sci.* 2016, 9, 1224.
[24] L. F. Villalobos, M. T. Vandat, M. Khchoune, Z. Nadizadeh, M. Mensi, E. Oveisi, D. Campi, N. Marzari, K. V. Agrawal, *Sci. Adv.* 2020, 6, eaay9851.

Although the present disclosure has been described with respect to one or more particular embodiments and/or examples, it will be understood that other embodiments and/or examples of the present disclosure may be made without departing from the scope of the present disclosure.

The invention claimed is:

1. A composite article comprising a porous substrate and a membrane, wherein the membrane comprises a first layer and a second layer, wherein at least a portion of the porous substrate has the first layer disposed thereon and at least a portion of the first layer has the second layer disposed thereon and the first layer comprises a plurality of polymer chains comprising a plurality of silicon-oxygen groups and a plurality of silicon-carbon groups and the first layer has a silicon to oxygen ratio of about 4:1 to about 1:1.25;

a silicon to carbon ratio of about 1:2 to about 1:10; and the second layer comprises a plurality of polymer chains comprising a plurality of silicon-oxygen groups and a plurality of silicon-carbon groups and the second layer has a silicon to oxygen ratio of about 1:1 to about 1:2;

a silicon to carbon ratio of about 2:1 to about 10:1; and at least a portion of the polymer chains of the second layer are crosslinked.

2. The composite article of claim 1, wherein the second layer has a thickness of 0.1 nm to 50 nm.

3. The composite article of claim 1, wherein the membrane has an area of 1 $cm^2$ or above.

4. The composite article of claim 1, wherein the plurality of polymer chains comprising a plurality of silicon-oxygen groups and a plurality of silicon-carbon groups of the first layer are chosen from Si-containing polymers, Si-containing polymer blends, polymers doped by Si-containing chemicals, and combinations thereof.

5. The composite article of claim 4, wherein the Si-containing polymers are chosen from polysiloxanes, polysilanes, polysilazanes, polycarbosilanes, polysilphenylenes, and combinations thereof.

6. The composite article of claim 1, wherein the first layer comprises polydimethylsiloxane, polydiethylsiloxane, polyethylmethylsiloxane, polyoctylmethylsiloxane, polytetradecylmethylsiloxane, poly(methylhydrosiloxane), poly(m- ethylphenylsiloxane), poly(dimethylsiloxane-co-alkylmethylsiloxane), poly(dimethylsiloxane-co-diphenylsiloxane), and combinations thereof.

7. The composite article of claim 1, wherein the first layer has a thickness of 100 nm to 5 μm.

8. The composite article of claim 1, wherein the porous substrate is chosen from polysulfones, polyether sulfones, polyamides, polyimides, polyetherimides, polyesters, polycarbonates, copolycarbonate esters, polyethers, polyetherketones, polyvinylidene fluoride, polybenzimidazoles, polybenzoxazoles, cellulosic derivatives, polyazoaromatics, poly (2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyguinoxaline, polyamideimides, polyamide esters, blends thereof, copolymers thereof, substituted materials/derivatives/analogues thereof, zeolites, and combinations thereof.

9. The composite article of claim 1, wherein the porous substrate has a thickness of 10 μm to 200 μm.

10. The composite article of claim 1, wherein the membrane is disposed on at least a portion of an exterior surface of a hollow fiber or flat sheet membrane.

11. The composite article of claim 1, wherein the composite article has a hydrogen to other gas(es) permeability ratio of 10:1 to 100:1; and/or helium to other gas(es) permeability ratio of 10:1 to 200:1.

12. The composite article of claim 1, wherein the composite article has a hydrogen and/or helium permeance of 50 to 2000 GPU.

13. A device comprising one or more composite article(s) of claim 1.

14. The device of claim 13, wherein the device is a gas separation device or a liquid separation device.

15. The device of claim 14, wherein the gas separation device is configured to separate helium gas and/or hydrogen gas from one or more hydrocarbon gas(es).

16. The device of claim 14, wherein the liquid separation device is configured as a nanoseparation device.

17. A gas separation method, comprising:

contacting a gas sample comprising i) hydrogen and/or helium; and ii) carbon monoxide and/or carbon dioxide and/or one or more hydrocarbon(s), with a composite article of claim 1 or a device comprising the composite article of claim 1;

wherein at least a portion or all of the hydrogen and/or helium is separated from at least a portion or all of the carbon monoxide and/or carbon dioxide and/or the one or more hydrocarbon(s).

18. The method of claim 17, wherein the method is carried out at a temperature of −20° C. to 100° C.

19. The method of claim 17, wherein the ratio of separated i) hydrogen to ii) carbon monoxide and/or carbon dioxide and/or one or more hydrocarbon(s) is about 10:1 to about 100:1.

20. The method of claim 19, wherein the ratio of separate i) helium to ii) carbon monoxide and/or carbon dioxide and/or one or more hydrocarbon(s) is about 10:1 to about 200:1.

* * * * *